Dec. 20, 1960  G. H. OROZCO  2,964,887
APPARATUS FOR POLISHING
Filed Feb. 24, 1958  6 Sheets-Sheet 1

INVENTOR
Gilbert H. Orozco
BY McCoy, Greene & Te Grotenhuis
ATTORNEYS

Dec. 20, 1960   G. H. OROZCO   2,964,887
APPARATUS FOR POLISHING
Filed Feb. 24, 1958   6 Sheets-Sheet 2
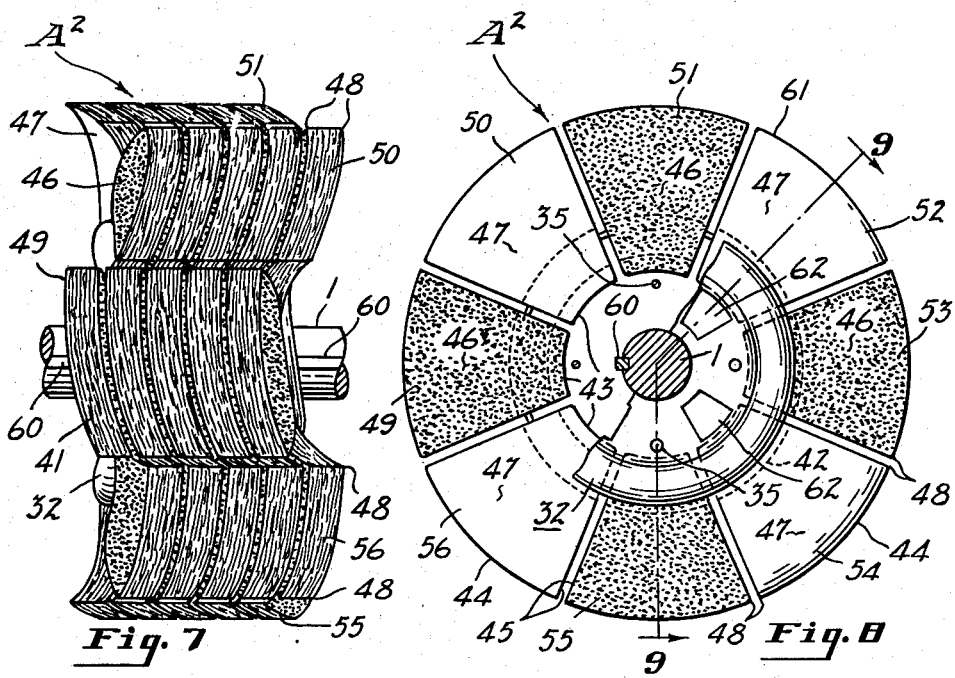
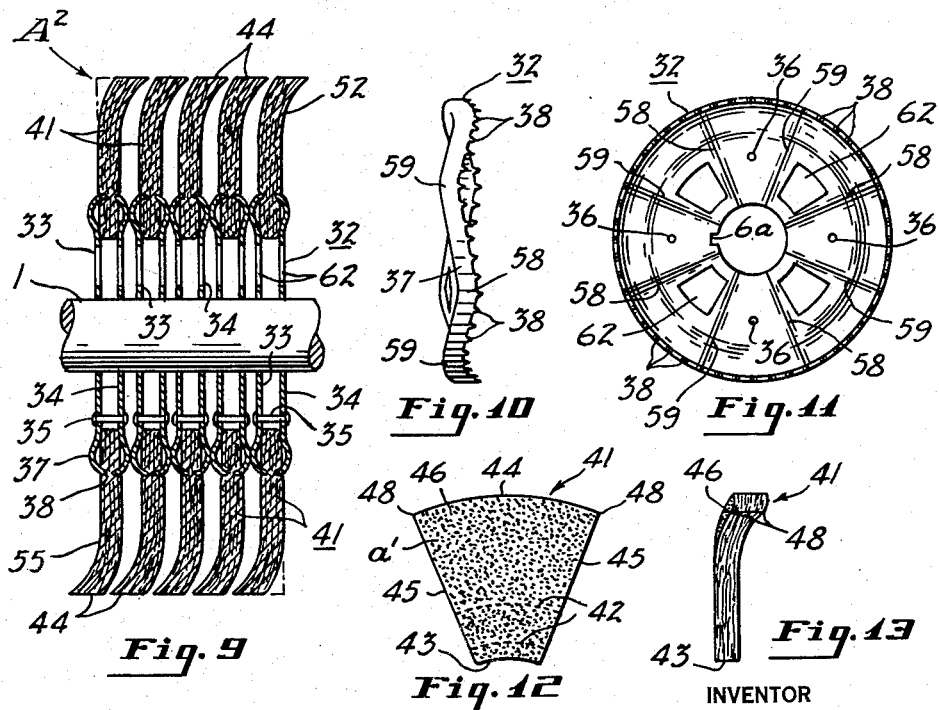
INVENTOR
Gilbert H. Orozco
BY
ATTORNEY

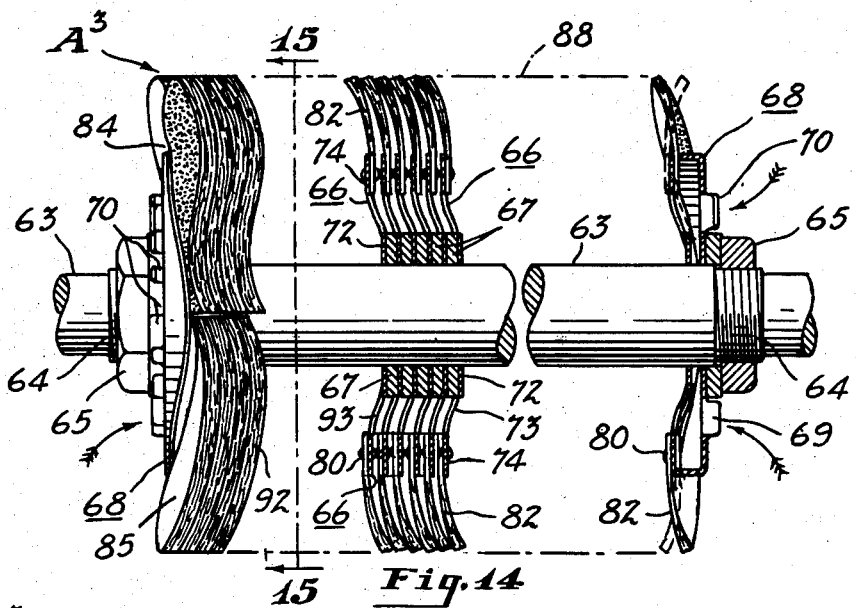
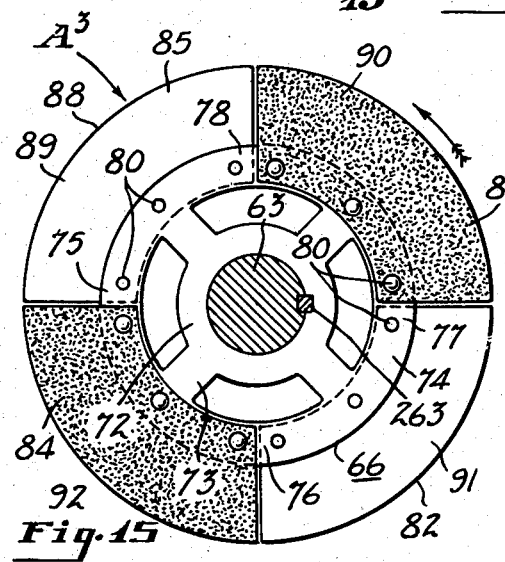
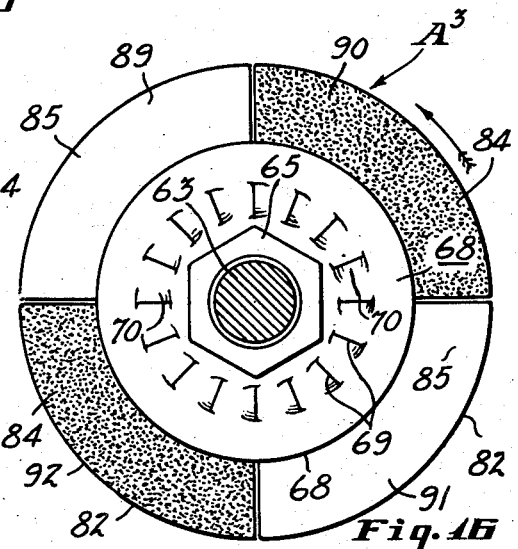
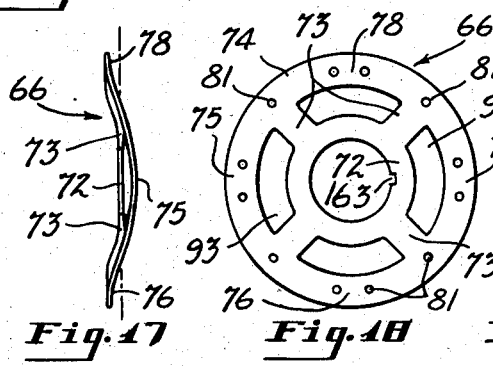
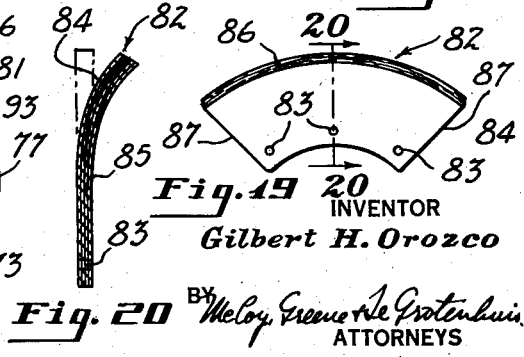

Dec. 20, 1960   G. H. OROZCO   2,964,887
APPARATUS FOR POLISHING
Filed Feb. 24, 1958   6 Sheets-Sheet 4

INVENTOR
*Gilbert H. Orozco*

BY *McCoy, Greene + LeGrotenhuis*
ATTORNEYS

Dec. 20, 1960
G. H. OROZCO
2,964,887
APPARATUS FOR POLISHING
Filed Feb. 24, 1958
6 Sheets-Sheet 5
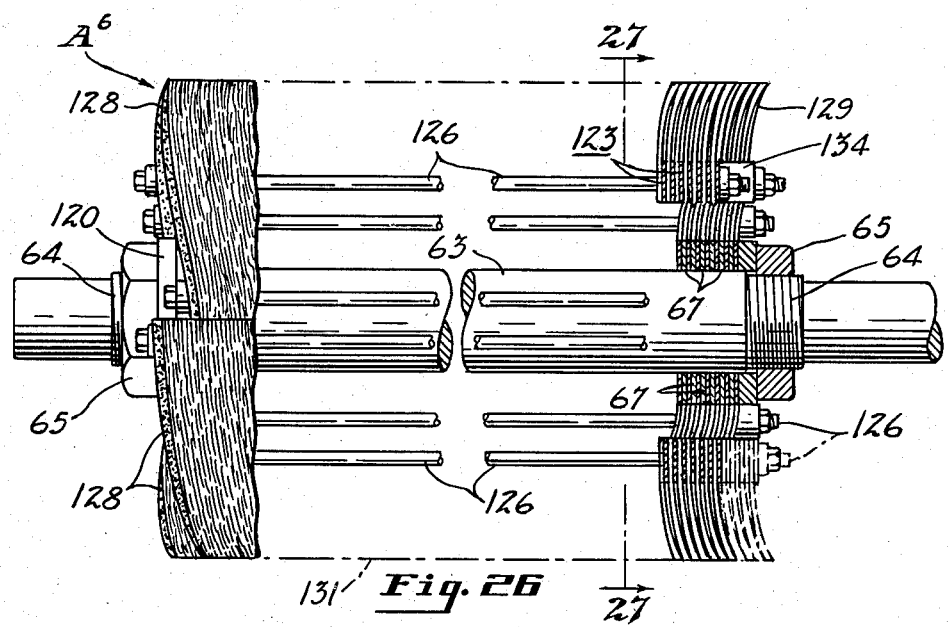
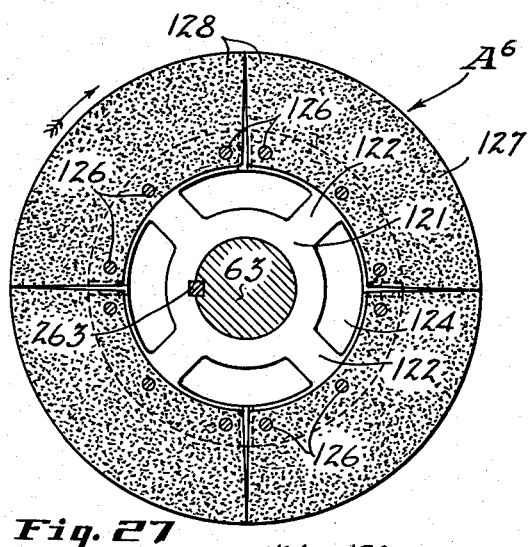
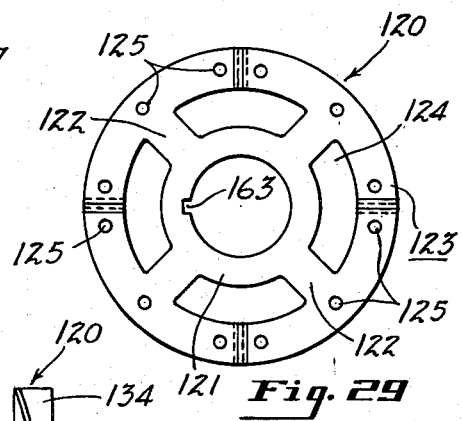
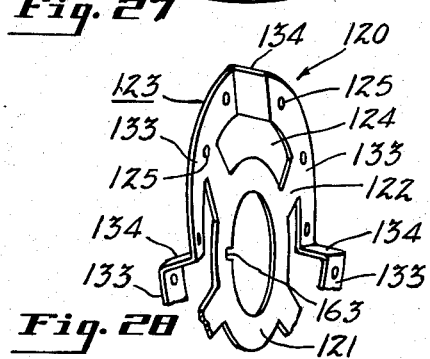
INVENTOR
*Gilbert H. Orozco*
ATTORNEYS Dec. 20, 1960    G. H. OROZCO    2,964,887
APPARATUS FOR POLISHING
Filed Feb. 24, 1958    6 Sheets-Sheet 6
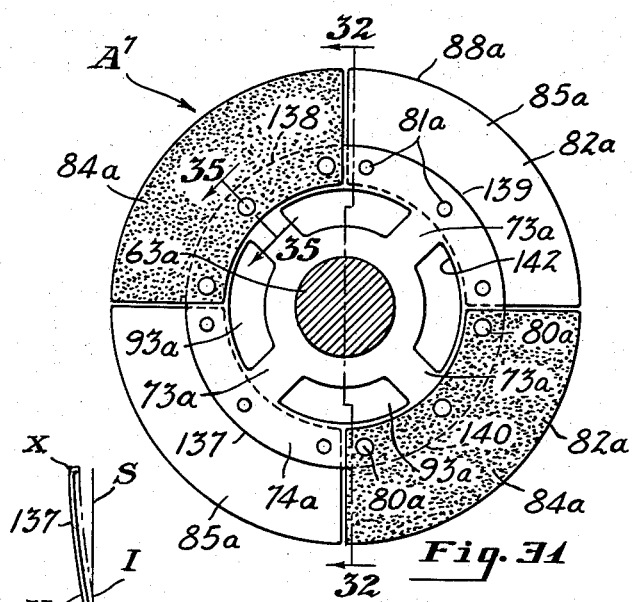
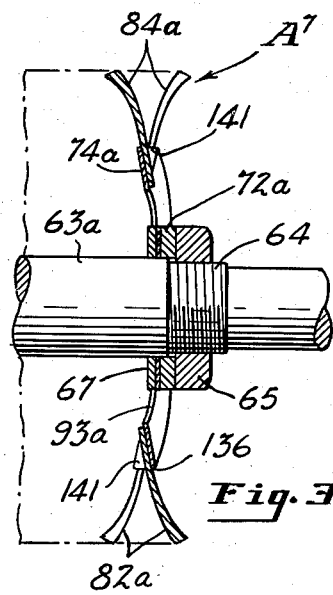
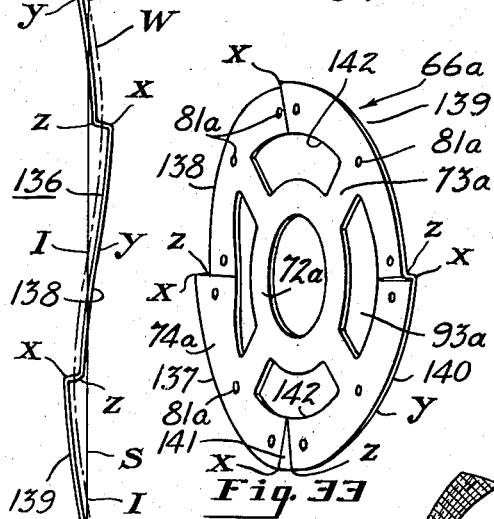
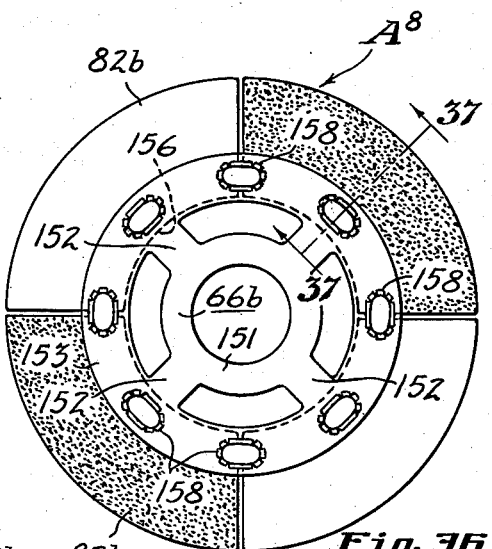
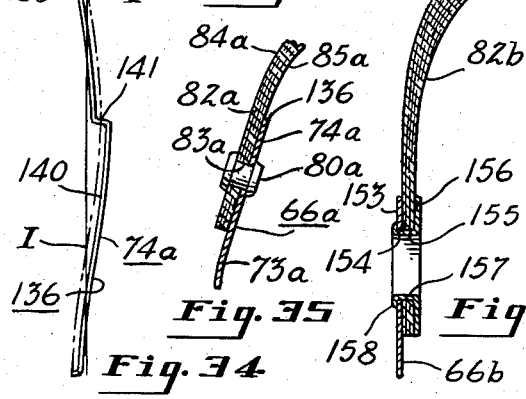
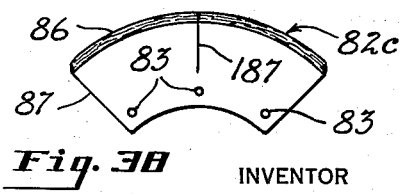
INVENTOR
Gilbert H. Orozco
BY McCoy, Greene + LeGrotenhuis
ATTORNEYS United States Patent Office 2,964,887
Patented Dec. 20, 1960

2,964,887
APPARATUS FOR POLISHING

Gilbert H. Orozco, Euclid, Ohio, assignor to Fin Del Co., Cleveland, Ohio, a corporation of Ohio Filed Feb. 24, 1958, Ser. No. 717,001

16 Claims. (Cl. 51—193)

The present invention relates to the art of polishing and more particularly to apparatus for polishing metal surfaces rapidly which employs a polishing wheel having circumferentially inclined abrasive sheets.

Heretofore, wavy polishing wheels made of cloth or other soft flexible material have been provided in which abrasive material was rubbed on the periphery of the wheel, but the action of such wheels is relatively slow and does not compare with the aggressive action of a wheel having abrasive grains bonded to the wheel. Satisfactory results cannot be obtained merely by bonding abrasive grains to the periphery of a wheel since such grains soon wear off and leave a hard smooth surface on the wheel unsuitable for polishing operations.

A grinding wheel operable in either direction of rotation can be formed by folding a strip of sandpaper, emery cloth or similar material, but such a wheel does not polish efficiently because of the fact that the abrasive covered surfaces of the paper or cloth layers face in more than one circumferential direction whereby about half of the backing material precedes the abrasive into the work. As a result the abrasive is not firmly anchored as it contacts the work. Where a cloth backing precedes its abrasive grains to the work, the abrasive is torn off before it is able to cut effectively and the strands of the cloth accumulate so as to interfere with the cutting action of the remaining abrasive.

Considerable difficulty has been experienced in the past with polishing wheels employing abrasive-coated sheets because of the buildup of waste material which produced a dull or loaded surface. As a result of this loading or glazing, the wheels did not polish effectively even when used on hard steels. Such polishing wheels could not be used on aluminum or other softer metals because of excessive loading and were impractical for many grinding and polishing jobs because of the excessive cost of the frequent dressing operations necessary to remove the waste accumulation, particularly where the surfaces of the articles to be polished were covered by thin films of non-metallic materials, such as die lubricants and phosphates.

Polishing wheels employing abrasive-grains have previously been unable to produce scratch-free highly polished surfaces and have lacked the rigidity necessary for highly accurate work.

The present invention provides methods of polishing which do not have the defects mentioned above, which are simple and relatively inexpensive, and which are extremely efficient even where the material is soft or is coated with soft non-metallic materials. According to one method of the present invention abrasive material is applied to the work from a series of sheets carried by a wheel rotating at high velocity, the sheets engaging the work so that only the abrasive material at the outer peripheral edge of the sheets engages the work. This insures that the abrasive and its backing wear away before the abrasive is dulled by overheating or by loading (waste accumulation).

The wheel may be rotated at high surface speeds to obtain an effective polishing action, to hold the abrasive sheets perpendicular to the axis of rotation, and to exert a strong force against the work so that the abrasive material has an aggressive cutting action and is detached from the wheel before its cutting efficiency is reduced substantially.

According to the present invention, the sheets are supported during the polishing operation so that the point of engagement of each sheet with the work moves relative to the work generally in the direction of the axis of rotation of the polishing wheel and preferably so that all of the abrasive material precedes its backing into the work. Such relative axial movement may be obtained, without moving the polishing wheel or the work in the direction of said axis during rotation of said wheel, by mounting the abrasive-coated sheets so that they are inclined circumferentially. The rate of axial movement is preferably varied to break off the chips before they become large enough to interfere with the polishing operation.

The method of this invention comprises causing relative axial movement between the work and the work-containing portion of each abrasive-coated sheet during rotation of polishing wheel and is preferably performed by a laminated polishing wheel having segmental abrasive-coated sheets which are inclined in one or more directions to obtain said relative axial movement. The peripheral edges of the abrasive-coated sheets may be arranged in a wavy or undulating pattern so that the faces of different sheets are inclined circumferentially in opposite directions. The sheets are supported firmly with all of the abrasive surfaces of the sheets facing the same circumferential direction so that the abrasive grains precede the backing material to the work and are firmly held as they engage the work. The abrasive entering the work will first cut itself free or through irregularities in the surface of the work so as to effect polishing of the work in a rapid efficient manner.

The inclined arrangement of the laminations insures that the abrasive is presented to the work in such a manner that it prevents successive particles from forming an unwanted groove.

The abrasive-coated sheets may be in the form of segments arranged in axial rows around the wheel. All of the rows may have the segments inclined in the same direction, but it is preferable to have the segments in different rows inclined in different directions with abrasive-coated surfaces facing opposite ends of the wheel. Excellent results are obtained where a polishing wheel is provided having the peripheral edges of the abrasive-coated sheets arranged in an undulating or wavy pattern. The wavy arrangement of the laminations insures that the abrasive is presented to the work with a continually varying pressure and with a continual change in the direction of the pressure and not only prevents successive particles from forming an unwanted groove but also breaks off the chips as it is formed. As a result each chip is prevented from becoming large enough to fill up the space between the abrasive particles and/or building up around and over them. The wheel of the present invention, therefore, is able to function most effectively to remove surface irregularities from the work.

It is preferable to provide hub members which hold the radially inner portions of the abrasive sheets so that the radial cross sections of said portions are either perpendicular to the axis of rotation of the wheel or inclined axially with respect to said axis in a direction to expose more abrasive material at the periphery of the wheel.

An object of the invention is to provide a method of polishing which avoids waste accumulation or loading of the polishing wheel and permits operation of the wheel at optimum efficiency at all times until the wheel is worn out.

Another object of the invention is to provide a polishing wheel which may be operated satisfactorily at extremely high surface speeds.

A further object of the invention is to provide a method of producing a very fine finish with a polishing wheel that has an aggressive cutting action.

An object of the invention is to provide a polishing wheel wherein the cloth backing wears away as the abrasive grains are removed so that the wheel retains an effective cutting action.

Another object of the invention is to provide an abrasive wheel which polishes rapidly and effectively and requires little attention in use.

A further object of the invention is to provide a simple inexpensive laminated polishing wheel which removes surface irregularities from metal parts or the like with maximum efficiency.

Other objects, uses and advantages of the invention will become apparent to those skilled in the art from the following description and claims, and from the drawings in which:

Figure 7 is a fragmentary side elevational view showing the central portion of a modified form of polishing wheel constructed according to the present invention;

Figure 8 is an end view of the polishing wheel of Fig. 7 with parts omitted;

Figure 9 is a fragmentary sectional view taken on the line 9—9 of Fig. 8 and on the same scale as Figs. 7 and 8, the end portions of the polishing wheel being omitted as in Fig. 7;

Figure 10 is a side elevational view of one of the sheet metal hub members employed on the polishing wheel of Figs. 7 to 9;

Figure 11 is a plan view of the hub member of Fig. 10 on the same scale as Figs. 7 to 10;

Figure 12 is an elevational view showing a pack of sector-shaped segments or laminae as used on the peripheral portion of the polishing wheel of Figs. 7 to 9;

Figure 13 is an end view of the sector-like pack of Fig. 12;

Figure 14 is a side elevational view on a reduced scale with parts broken away and shown in section showing another form of polishing wheel according to the present invention;

Figure 15 is a vertical sectional view taken substantially on the line 15—15 of Fig. 14 and on the same scale;

Figure 16 is an end view of the polishing wheel of Figs. 14 and 15 on the same scale;

Figure 17 is an end view of one of the hub members employed in the wheel of Figs. 14 to 16 on a reduced scale;

Figure 18 is a plan view of the hub member shown in Fig. 17 on the same scale;

Figure 19 is an elevational view showing a pack of sector-shaped segments or laminae as employed on the polishing wheel of Figs. 14 to 16 and on a smaller scale;

Figure 20 is a vertical sectional view of the sector-like pack of Fig. 19 on a larger scale, the pack being shown in solid lines in its position when the polishing wheel is stationary and being shown in dot-dash lines in the position it assumes when the polishing wheel is rotated at high velocity for polishing;

Figure 26 is a front elevational view on a reduced scale with parts broken away and shown in section showing another modified form of polishing wheel according to the present invention;

Figure 27 is a vertical sectional view taken substantially along the line indicated at 27—27 in Fig. 26 and on the same scale;

Figure 28 is a fragmentary perspective view on a reduced scale showing one of the hub members employed in the polishing wheel of Figs. 26 and 27;

Figure 29 is a plan view of the hub member of Fig. 27 on a reduced scale;

Figure 30 is an edge view of the hub member of Fig. 29 on the same scale;

Figure 31 is a vertical sectional view on a reduced scale taken through the shaft of a modified form of polishing wheel according to the present invention;

Figure 32 is a fragmentary sectional view with parts omitted taken substantially on the line indicated at 32—32 in Fig. 31 and on the same scale;

Figure 33 is a perspective view of one of the hub members employed in the wheel of Figs. 31 and 32 on a reduced scale;

Figure 34 is a diagrammatic view showing the peripheral edge of the hub member of Fig. 33 developed in a plane on a reduced scale, a sine curve being shown in dot-dash lines to show the circumferential curvature of said peripheral edge and a straight line being shown in a solid line to illustrate the location of a plane perpendicular to the axis of rotation of the hub member;

Figure 35 is a fragmentary sectional view taken on the line 35—35 of Fig. 31 and on a larger scale;

Figure 36 is a plan view showing a portion of a modified form of polishing wheel according to the present invention on a reduced scale;

Figure 37 is a fragmentary sectional view taken on the line 37—37 of Fig. 36 and on a larger scale; and Figure 38 is an elevational view showing a modified pack of segments which may be employed on the polishing wheel of Figs. 14 to 16 to replace the pack shown in Fig. 19.

Figure 1:
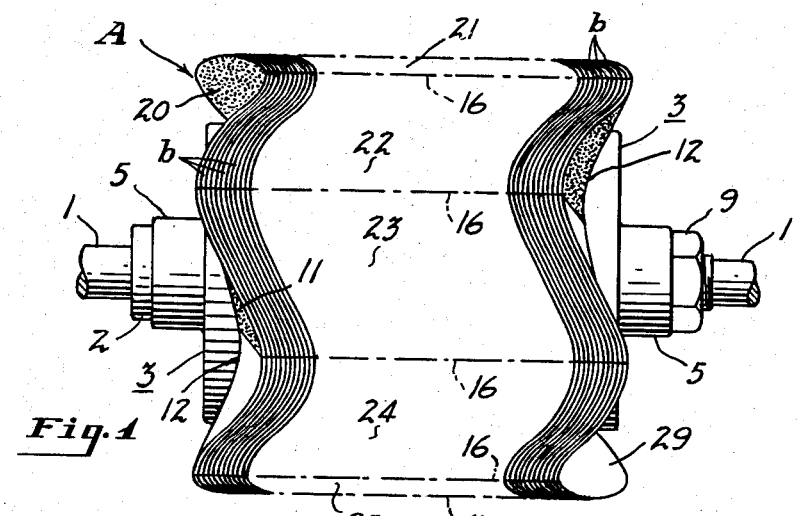
Figure 1 is an elevational view on a reduced scale showing one form of polishing wheel according to the present invention.
Figure 2:
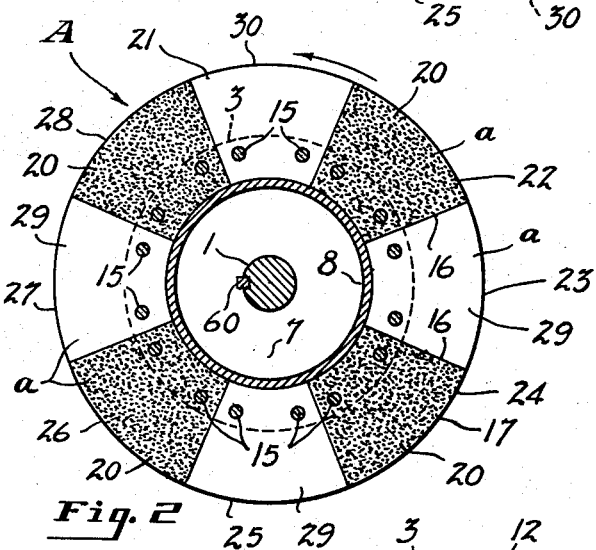
Figure 2 is an end view, with parts broken away and shown in section, to show one of the laminae making up the wheel of Fig. 1.
Figures 4, 5:
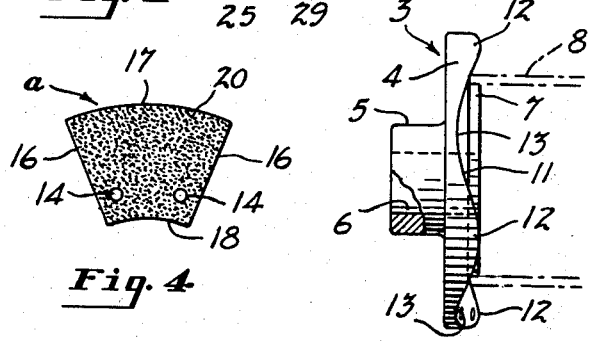
Figure 4 is a plan view showing one of the segments which are assembled to form each lamina of the polishing wheel.
Figure 5 is a elevational view, with parts broken away and shown in section, on the same scale as Figs. 1 to 4, showing one of the clamping members used to hold the laminae in position on the polishing wheel, the tubular members on which the laminae are mounted being shown in dot-dash lines.

Referring more particularly to the drawings in which like parts are identified by the same numerals throughout the several views, sometimes with suffix letters added, Figs. 1 and 2 show an externally cylindrical laminated one-direction polishing wheel A mounted for rotation on a shaft 1 having a stop collar 2. The shaft may be slotted to receive a key 60 as shown in Fig. 2 but such key may be omitted. A pair of clamping members 3, as shown in Fig. 5, are mounted on the shaft 1, each clamping member having a circular disk portion 4 perpendicular to the shaft 1, an annular hub portion 5 that fits on the shaft, a keyway 6 to permit keying of member to the shaft, and a projecting cylindrical portion 7 having a diameter greater than that of the hub portion. A cylindrical sleeve or tube 8 of uniform thickness and uniform axial length is mounted on the cylindrical portions 7 of the two clamping members 3 so that a rigid construction is provided when the tube 8 is gripped between the clamping members by tightening the nut 9. If desired, the tube may be perforated and conventional means may be provided to cool the wheel with air.

Each clamping member 3 has a smooth, regularly curved surface 11 which is symmetrical with respect to the axis of the shaft 1. The surface 11 is shaped so that any cylindrical surface of uniform radius coaxial with the shaft 1, which intersects the surface 11, will intersect the latter surface along a sinusoidal-type line which reverses its curvature at an even number of points such as four or more of the eight points shown which are regularly spaced circumferentially. Each of the portions 4 has four regularly spaced, smoothly curved protuberances 12 and four similarly curved recesses between such protuberances. The bottom surfaces 13 of said recesses are axially aligned with the protuberances 12 on the other clamping member 4 as is apparent from Fig. 1. Any radial plane through the axis of the shaft 1 preferably intersects the two surfaces 11 of the two clamping members along parallel lines perpendicular to said axis. It will be understood that various sinuous surfaces may be used in place of the regular sinusoidal-type surfaces 11.

A multiplicity of sector-shaped segments $a$ may be clamped between the members 3 to form the polishing wheel A. Each segment $a$ is constructed as shown in Fig. 4 and may have two circular holes 14 to receive rods or bolts 15 for holding the segments in alignment and in position on the sleeve 8. Each segment $a$ has two straight radial edges 16 and concentric outer and inner curved edges 17 and 18, respectively, of uniform curvature, having their centers of curvature at the intersection of the extended lines at 16. Each segment $a$ is of substantially uniform thickness and comprises a uniform-thickness backing layer of paper, cloth or the like, having one face 20 completely covered with abrasive particles of emery, silicon carbide, boron carbide, garnet, corundum, aluminum oxide, or the like, and its opposite face 29 free of abrasive material. The backing layer is preferably cloth. The abrasive particles may be bonded to the backing layer by glue or a special adhesive as is well understood in the art. (See U.S. Patent No. 2,704,916.) Each of the segments $a$, for example, may be cut from a piece of conventional sandpaper, emery cloth, or other coated abrasive materials. The size of the abrasive particles will depend on the type of polishing action desired. The abrasive particles may, for example, be of a size to pass through a standard 240, 150 or 180 mesh screen.

The polishing wheel A includes a multiplicity of flaps or laminae $b$ held in superposed contiguous relation as indicated in Fig. 1 with the peripheral edges of each lamina $b$ located substantially at the cylindrical outer surface 30 of the wheel and having a generally sinusoidal shape. Each lamina $b$ consists of a series of segments $a$ arranged with the radial edges 16 in aligned abutting relation. As shown in Figs. 1 and 2, the wheel A has an even number greater than two and usually at least four or as shown eight rows of segments 21 to 28, respectively, engaging the tube 8 throughout its circumference, the outer surfaces 17 of the segments in said rows being located in substantially a cylinder concentric to the shaft 1 and the tube 8 to form the work-engaging surfaces 30.

Suitable clamping means may be provided to hold the segments in place. As herein shown the holes 14 of the segments of each row are axially aligned with each other and with similar holes in the clamping members 3 and co-act with the bolts 15 which extend through said segments and said clamping members to hold the segments so that their outer surfaces 17 are generally concentric with the shaft. The bolts 15 may apply the force needed to clamp the segments together, but all or most of this force may be applied by tightening the nut 9 on the externally threaded portion of the shaft 1.

The wavy surfaces 11 of the clamping members 3 firmly hold the laminae $b$ in contact, and in parallel relation, the outer surfaces 17 of the segments in each lamina being located substantially in a sinusoidal-like line located in the cylindrical work-engaging surface 30 of the wheel. It will be noted that each segment $a$ reverses its curvature at its medial line and that the radial edges 16 of each segment are located in axial alignment with the axially outermost point on one protuberance 12 and the axially innermost point of the surface 13 adjacent said protuberance whereby the entire abrasive face 20 of each segment $a$ faces in only one circumferential direction.

Figure 3:
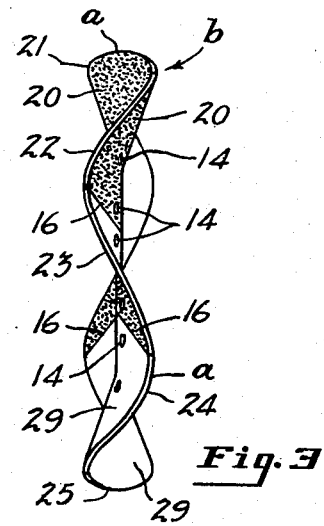
Figure 3 is an elevational view of one lamina on the same scale as Figs. 1 and 2.

As indicated in Fig. 2 the abrasive-coated face 20 of each flap or segment in one row faces in an axial direction opposite to the abrasive coated faces 20 of the segments in the two rows adjacent said one row. The segments $a$ making up each of the rows 21 to 28 are in axial alignment with the other segments in that row and have their abrasive coated faces 20 facing the same end of the wheel A. The abrasive faces 20 of all the segments $a$ face in the same circumferential direction as is apparent from Fig. 3, and all of the uncoated faces 29 face in the opposite circumferential direction. As a result the abrasive particles of each lamina $b$ engage the work before the backing layer therefor when the the wheel A is rotated in the proper direction.

It will be noted that unlike most polishing wheels, the polishing wheel of the present invention functions at optimum efficiency only when rotated in one direction. When so operated the abrasive grains are firmly held by the cloth or other backing as they move into engagement with the work. When the abrasive grain is worn from the backing, the part of the backing that comes between the falling grains and the work is rapidly ground off presenting new abrasive grains which are firmly held. Where a conventional cloth backing is employed, the threads are rapidly ground off so that they cannot interfere with the cutting action of the remaining abrasive grains. If the wheel is rotated in the wrong direction, however, so that the cloth backing engages the work before the abrasive grains held by said backing, a "dirty" wheel is obtained due to the rapid separation of the grains from the backing, the cutting action is inefficient, and the threads attain lengths of as much as ¼ to ½ inch so as to interfere with the operation of the wheel. In the preferred types of polishing wheels according to the present invention the outermost grains engage the work rather than the radially inner grains so that the grains are removed before there is a substantial dulling of the grain. The polishing wheel can function effectively for long periods of time before the segments $a$ are worn sufficiently to require replacement.

Figure 6:
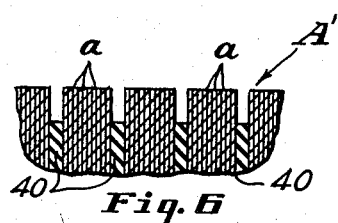
Figure 6 is a fragmentary view showing a modified form of polishing wheel constructed generally like the polishing wheel of Figs. 1 to 5.

Figure 6 shows a polishing wheel A', which is the same as the polishing wheel A described above except that flexible spacer members 40 of uniform thickness are provided between certain of the segments $a$. The spacer members may be made of rubber, paper, steel or other suitable flexible or rigid material and may be formed in segments like the segments *a*. The clamping members 3 will hold the segments *a* of the wheel A' in positions generally as shown in Fig. 1 so that said wheel functions generally like the wheel A described above.

In the polishing wheels of Figs. 1 to 6, the segments *a* are curved circumferentially. A radial plane containing the axis of rotation of the polishing wheel would intersect each segment *a* along a substantially straight line perpendicular to said axis. As a result the abrasive faces of the segments *a* do not face radially outwardly toward the work. However, each segment *a* may be normally curled so that the abrasive tends to face radially outwardly. The centrifugal force would tend to straighten the segments, however.

Each lamina may be normally curved so that the abrasive grains at the periphery of the wheel face radially outwardly during rotation of the wheel. The latter construction is shown in Figs. 7 to 13 of the drawings which are drawn substantially to scale. Figs. 7 to 9 show a modified form of polishing wheel $A^2$ which may be mounted on the shaft 1 described above to replace the polishing wheel A. The wheel $A^2$ has a series of sheet metal hub members 32 clamped between the stop collar 2 and the nut 9 of the shaft 1. Each hub member 32 has a left portion 33 and a complementary right portion 34 of substantially the same size and shape which are rigidly connected together by rivets 35 or other suitable means. Each of the portions 33 and 34 has four regularly spaced holes 36 to receive the rivets 35 and at least four regularly spaced openings 62 for cooling air and has a keyway 6*a* to receive the key 60 of the shaft 1. Each of the portions 33 and 34 has an outer marginal portion 37 of curved radial cross section with a series of pointed teeth 38 which are regularly spaced about the circumference of the hub member as indicated in Figs. 10 and 11. The openings 62 of the hub members 32 are arranged in axially aligned rows to permit free flow of cooling air along the length of the wheel as is apparent from Fig. 9.

The hub members 32 serve to grip a series of rows of laminated sector-shaped packs or sections 41 so as to form an externally cylindrical polishing wheel. Each section 41 may be of a size and shape as indicated in Figs. 12 and 13 and comprises a multiplicity of flaps or laminae *a'* held together by lines of sewing 42 near the radial inner end of the section. Each lamina *a'* is shaped somewhat similar to the lamina *a* shown in Fig. 4 but is curved in a different manner. The laminated section 41 has concentric radially inner and outer edges 43 and 44, respectively, and radial side edges 45. Each lamina *a'* comprises a uniform thickness backing layer of cloth, paper, or other flexible material (preferably cloth) having one face completely covered with an abrasive layer 46 and its opposite face 47 free of abrasive material. The abrasive layer may be formed of abrasive particles of emery, silicon carbide, boron carbide, garnet, corundum, crystalline alumina, or similar material, and these abrasive particles may be bonded to the backing layer by means of glue or as a special adhesive in the conventional manner, for example, as disclosed in U.S. Patent No. 2,704,916.

The shape of the hub members 32 and the section 41 will be apparent from Figs. 9 to 13 which are drawn substantially to scale to facilitate an understanding of the invention. It will be seen from Figs. 9 to 13 that each section 41 and each of the flaps or segments *a'* in that section are normally curved axially toward one end of the polishing wheel so that the abrasive surfaces of the outer peripheral portions of each section 41 face radially outwardly for engagement with the work. The parts are shown as they appear on a stationary wheel. The sections 41 will inherently straighten out due to centrifugal forces during the polishing operation, but the initial curvature will tend to cause the radially outermost portion of each lamina *a'* to face in a radial direction to present the abrasive to the work.

The sections 41 are mounted on the hub members 32 in axially arranged rows 49 to 56 which are regularly spaced around the circumference of the wheel $A^2$. The sections 41 in each of said rows are aligned axially and regularly spaced axially along the shaft 1, and all of the laminae *a'* in the sections of that row have their abrasive faces 46 facing in the same axial direction (as is the case in the polishing wheel A described above and in all the other polishing wheels disclosed herein) and are curved in the same axial direction so that the abrasive faces 46 facing in the same axial direction (as the periphery of the wheel.

The radial edges 45 of the sections 41 may be arranged in abutting relation or may be closely spaced as indicated in Fig. 8 to permit the flow of cooling air between circumferentially adjacent sections. The adjacent sections preferably are arranged so that adjacent edges 45 are parallel and parallel to a plane containing the axis of rotation of the wheel, but it will be apparent that this construction can be varied considerably. As herein shown, the corner points 48 of adjacent sections 41 are about one quarter of an inch apart, but adequate cooling can be obtained without such spacing since the air flows between adjacent sheets *a'* of each section 41.

The wheel $A^2$ is similar to the wheel A described above in that the abrasive coated face 46 of each lamina *a'* in one of the rows 49 to 56 faces in an axial direction opposite to the abrasive coated faces 46 of the laminae in the two rows adjacent that one row. This means that the laminae of any row are curved axially in a direction opposite to the laminae of the next adjacent row as is apparent in Fig. 7, which illustrates the positions of the laminae when the wheel is stationary.

The hub members 32 are shaped to hold the sections 41 so that all of the abrasive coated faces 46 of all of the laminae forming the polishing wheel face in the same circumferential direction. Each hub member 32 undulates circumferentially somewhat like the hub member 12 described above. As herein shown the undulations of the hub members 32 are regularly spaced about the circumference of the hub member to provide axial innermost portions 58 and axial outermost portions 59. As a result of this construction the sections 41 of adjacent rows are inclined in opposite directions as indicated in Fig. 7. It will be apparent that the portions 58 of each element 33 are axially aligned with the portions 59 of the associated element 34 so that the sections 41 may be gripped properly.

As with the grinding wheel A, the abrasive particles of the grinding wheel $A^2$ precede the abrasive-supporting backing into the work so as to obtain an ideal cutting action. The laminae *a'* may be arranged in a wavy or undulating manner to insure that the abrasive is presented to the work with a continual change in the direction of the pressure and not only to prevent successive abrasive particles from forming a groove but also to break off the chip as it is formed.

The marginal portions of each hub member 32 between the radially extending portions 58 and 59 may be curved like the other hub members disclosed herein, but are shown herein as being relatively straight so that each section 41 is supported with its radially inner portion flat. In the polishing wheel $A^2$ the eight sections 41 on each hub member 32 are rigidly supported in cantilever fashion so that the portion of each section 41 clamped between the hub portions 33 and 34 is held flat with the radially inner portion of each lamina *a'* located in a plane which contains a radial line perpendicular to the wheel axis. The radially inner portion of each flap or lamina *a'* is, therefore, firmly supported so that any radial plane containing the wheel axis and through said portion intersects said portion along a radial line perpendicular to said wheel axis.

When the polishing wheel A² is rotated (for example, to obtain a surface speed of 4000 feet per minute or over) at polishing speeds, the centrifugal force will tend to straighten out the radial cross section of each lamina a' as indicated by dot-dash lines in Fig. 9. Any radial plane containing the axis of the rotating wheel A² will, therefore, intersect each lamina a' along a radial line perpendicular to said axis. It will be noted that this is possible using segmental wheels but would not be possible if the abrasive sheets were in the form of inextensible circumferentially continuous discs bent from a flat to a wavy shape. The segmental construction permits the sheets to straighten out under the influence of centrifugal force so as to provide an aggressive wheel which does not load or become dull during use. It also permits the peripheral edge of each sheet to conform to the wavy shape of the hub member.

The wheel A² is effectively cooled since the centrifugal force causes a steady flow of air through the openings 62 and between adjacent laminae of every section 41 to the periphery of the wheel.

It will be noted that, as shown in Fig. 7, the outer peripheral work-engaging surface of the outermost sheet or lamina a' of each section 41 is located substantially in a plane containing a straight line through the corner points 48 of that lamina and that said straight line is at an inclination relative to a plane perpendicular to the axis of the wheel A² and its shaft 1, whereby the abrasive layer 46 of said lamina faces in one circumferential direction. This inclination is described throughout this application as "circumferential inclination." As said inclination increases the rigidity of the wheel decreases. The inclination of the line through the corner points 48 of the outer lamina a' of any section 41 relative to a plane perpendicular to the axis of rotation of the wheel should be less than 70 degrees and is preferably not substantially more than 50 degrees so that the laminae a' do not bend excessively in a circumferential direction when pressed against the work and so that the abrasive does not slap the work weakly with little cutting action. Such inclination should be at least 5 degrees and is preferably about 10 to 50 degrees during operation at polishing speeds so that the abrasive has a firm backing and an effective cutting action in spite of the tendency of the work to bend the laminae a' during engagement with the rotating wheel.

The lines of sewing 42 may be used as guides accurately to position each section 41 on the hub member 32 so that the outer edges 44 of the sections 41 provide a work-engaging surface 61 for the polishing wheel which is cylindrical and coaxial with the shaft 1. Of course, the polishing wheel can be trued, using conventional methods to be sure that the surface 61 is a cylindrical surface or other desired surface of revolution.

Figures 14 to 16 illustrate another form of the present invention having improved means for holding the abrasive segments and for cooling the wheel. These figures show a wheel A³ similar to the wheels A, A' and A² described above and rigidly mounted on a rotatable shaft 63. The shaft has threaded portions 64 at opposite ends of the wheel which receive a pair of hexagonal nuts 65 and has a narrow rectangular slot which receives an optional key 263. A series of sheet metal hub members 66 are mounted on the shaft 62 and are spaced apart by means of annular spacing members 67 as best shown in Fig. 14. A pair of end hub members 68 are mounted at the opposite ends of the wheel A³, each of these end members being constructed substantially like the members 66 but having an additional sheet metal portion providing a series of regularly circumferentially spaced air openings 69 and fan blades 70.

Each of the hub members 66 has a flat circular hub portion 72, radially extending portions 73, and a wavy or undulating marginal portion 74. The portion 72 is provided with a slot 163 to receive the key 263. The portion 74 is formed from a flat circular metal sheet of uniform thickness which is bent to a sinusoidal-like shape to provide four bowed sections 75 to 78 of the same size as best shown in Figs. 17 and 18. The entire surface of the marginal portion 74 may be generated by a moving radial line perpendicular to the wheel axis so that any radial plane containing the axis of the wheel A³ intersects the portion 74 along a radial line perpendicular to said axis. The diametrically opposed portions 75 and 77 are bowed axially in one direction and the portions 76 and 78 are bowed axially in the opposite direction, whereby the outer marginal edge of the hub member 66 is circumferentially sinuous. The preferred shape of said marginal edge is indicated in dot-dash lines in the developed view of Fig. 34. A series of rivet holes 81 are provided in the marginal portion 74 to provide means for attaching abrasive-coated sheets to the hub member.

A series of flaps or segments 82 are arranged in packs or sections and riveted to each hub member 66. Each segment 82 is in the form of a flexible non-metallic sheet (preferably abrasive-coated cloth) having three rivet holes 83 near its radially inner edge to receive the rivets 80. Each segment 82 has one face 84 covered with a uniform layer of abrasive particles and has its opposite face 85 uncoated and free of abrasive material. The arcuate outer edge 86 of each segment 82 has a uniform curvature so that four packs of segments 82 may be fitted together with their side edges in engagement as indicated in Fig. 15 to form a circle.

About five to fifteen segments 82 may be arranged in aligned superposed relation to form a pack or section as indicated in Fig. 20, four of such packs being mounted on each hub member 66 and on each end member 68 so that the hub members when assembled on the shaft 63, as shown in Fig. 14, provide a generally cylindrical outer work-engaging surface 88. The abrasive-coated faces 84 of each such pack face in the same direction and the pack is preferably curved slightly in radial cross section as indicated in Fig. 20 so that the abrasive faces 84 near the radially outer edge of the pack face radially outwardly for engagement with the work. The centrifugal force tends to straighten out the segments during rotation of the wheel as indicated in dot-dash lines in Fig. 20, but the initial curvature facilitates bending of the segments in the proper direction at the periphery when engaging the work.

The rivet holes 81 and 83 are located so that the packs of segments 82 have their radial side edges 87 at the centers of the bowed portions 75 and 78 as indicated in Fig. 15. The hub members 66 are mounted in axial alignment so as to provide four rows 89 to 92. The abrasive-coated faces 84 of the segments in each row are inclined circumferentially and face axially in the same direction as those of the diametrically opposed row and are inclined circumferentially and face axially in the opposite direction as those of the two adjacent rows, so that all of the abrasive-coated faces 84 face in the same circumferential direction. The wheel A³, therefore, functions substantially like the wheel A defined above.

The openings 93 in the hub members 66 are axially aligned to provide passages for the flow of air. During rotation of the wheel A³, the air is drawn through the inlet openings 69 of the fan blades and flows through the passages 93 and radially outwardly between adjacent segments 82 to the outer portion of the wheel so as to cool the work-engaging surfaces of the segments 82. The rivets 80 do not prevent the flow of cooling air between contacting segments in each pack of segments.

It will be apparent from Figs. 14 and 17 that the segments 82 are held by the marginal portions 74 so that the abrasive-coated faces 84 are inclined with respect to a plane perpendicular to the axis of rotation of the wheel. The hub members 66 provide means for holding the segments 82 in such a manner that a cylinder coaxial with the polishing wheel intersects each segment along a line, the major portion of which is inclined about at least 5 degrees (preferably about 10 to 50 degrees) relative to a plane perpendicular to the axis of said wheel. A similar circumferential inclination is provided in the other polishing wheels disclosed herein. In the wheel $A^3$, however, the circumferential inclination varies continually around the periphery because the peripheral portion 74 is generally sinusoidal.

The rivets 80 rigidly hold the radially inner portion of each pack of segments 82 against the marginal portion 74 of the hub member so that said radially inner portion assumes the bowed shape of said marginal portion and is securely held in this position. As a result each sheet or segment 82 is supported in cantilever fashion so that a radial plane containing the axis of the shaft 63 and through the segment intersects the radially inner portion of the segment along a straight line perpendicular to said axis. When the wheel is rotating at a speed sufficient for polishing, the centrifugal force causes the peripheral edges of the segments 82 to lie in sinusoidal curves similar to the curves formed by the peripheral edges of the hub member 66. As the centrifugal force increases the circumferential shape of the segments 82 more nearly resembles that of the hub members 66 and the radial cross section of each segment 82 more nearly approaches a straight line. The pressure of the work on each segment, of course, bends the radially outer portion of the segment so that it faces radially outwardly to expose more of the abrasive material.

Since one row of segments is detached from the adjacent row of segments, the centrifugal force does not tend to position the peripheral edge of the sheet in a plane perpendicular to the wheel axis, as would be the case if the abrasive sheets were originally flat circular discs with a diameter corresponding to that of the wheel $A^3$. The segmental construction, therefore, permits the segments 82 to straighten out in radial cross section so that only the abrasive grains at the peripheral edges of the segments 82 engage the work. It is this feature of the invention which avoids accumulation of waste material and dulling of the abrasive grains before they are worn off the wheel. The original curved radial cross section of the segments 82 tends to cause the outermost grains to face radially outwardly as they engage the work and the pressure of the work on the segments tends to do the same thing when the wheel is rotated in the proper direction. A person looking at the rotating polishing wheel would, probably be unable to detect the original curvature because of the centrifugal force. When the wheel was stopped, however, the segments 82 would assume a curved radial cross section and might even have a sloppy irregular appearance.

The polishing wheel $A^3$ functions generally like the wheel $A^2$ except that it has four rows of segments instead of eight. All of the abrasive-coated faces 84 of the segments in each row face in the same axial direction as all of the other abrasive-coated faces in that row and the uncoated faces 85 face in the opposite axial direction. The abrasive-coated faces of the segments 82 in one row face in the opposite axial direction as the abrasive-coated faces of the segments in the two adjacent rows as indicated in Figs. 15 and 16.

It will, therefore, be seen that all of the abrasive-coated faces 84 of all of the segments 82 face in the same circumferential direction. It will be apparent, however, that the advantages of the present invention may be obtained even though the faces 85 contain a minor portion of the abrasive particles. It would, however, be a waste of money to provide abrasive on the faces 85 since such abrasive particles would be torn away from the wheel before they could effectively cut substantial amounts of metal and would do more harm than good.

Figure 20A:
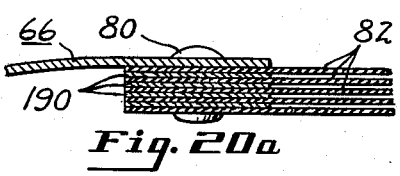
Figure 20a is a fragmentary sectional view showing a modified pack of segments mounted on the hub member of Figs. 17 and 18.

It is often desirable to decrease the stiffness of the polishing wheel, for example when performing the final polishing operation or when polishing curved surfaces of contoured or irregular articles. The stiffness of the wheel may be reduced as indicated in Fig. 20a by placing flat annular spacing sheets 190 between the adjacent sections 82 before they are attached to the hub member 66 by the rivets 80.

The stiffness may also be reduced by employing abrasive sheets of high flexibility. Abrasive sheets containing glue binders, for example, may be used which are much more flexible than abrasive sheets containing certain resinous binders.

Figure 22:
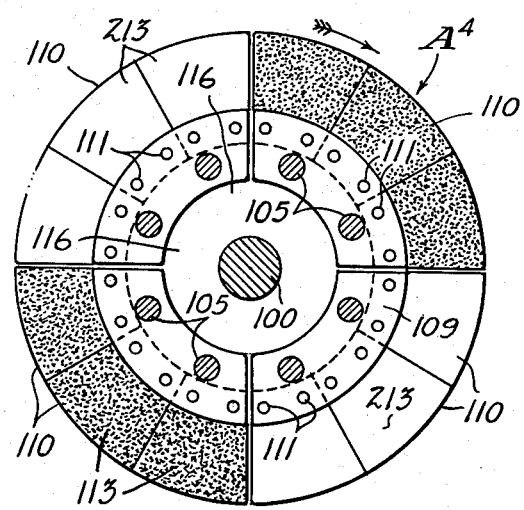
Figure 22 is a vertical sectional view taken substantially along the line indicated at 22—22 in Fig. 21 and on the same scale.
Figure 23:
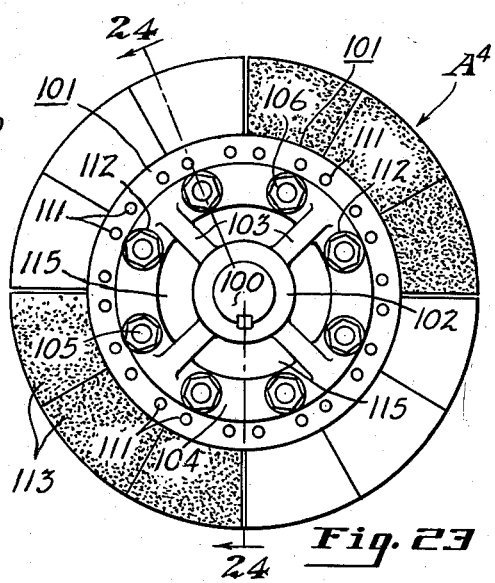
Figure 23 is an end view taken on the line 23—23 of Fig. 21 and on the same scale.

In the wheels described above the abrasive-coated faces of the segments in adjacent rows face axially in opposite directions. It will be apparent, however, that each row may be divided into or replaced by several rows of the same total circumferential extent whereby the abrasive-coated faces of the segments in some rows face in the same axial direction as those of an adjacent row. Such type of construction is illustrated in the modified form of polishing wheel $A^4$ of Figs. 21 to 23. The wheel $A^4$ is mounted on a shaft 100 for rotation about a horizontal axis. The wheel has a pair of end spiders or hub members 101 with hub portions 102 mounted and keyed to the shaft and radially extending portions 103 joining the hub portions to undulating sinusoidal-like marginal portions 104. A series of regularly spaced circular holes are provided in the hub members 101 to provide means for holding a series of supporting rods 105 parallel to the shaft 100, the end portions of each rod being threaded to receive nuts 106. Where the axial length of the wheel $A^4$ is not excessive, it is not necessary to provide central spiders or the like to reinforce the rods 105.

Figure 21:
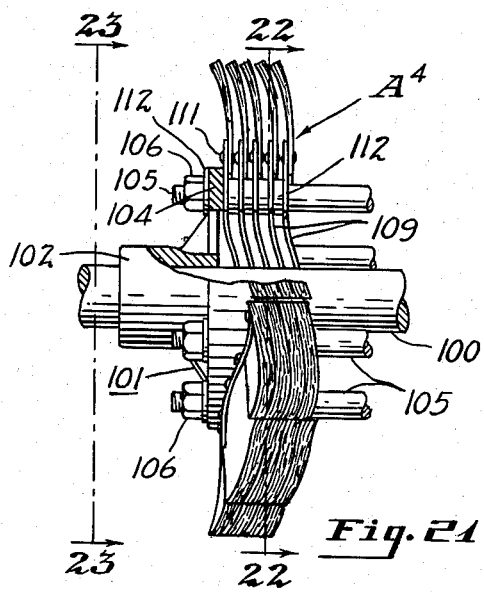
Figure 21 is a fragmentary side elevational view on a reduced scale with parts broken away and shown in section showing another form of polishing wheel according to the present invention.
Figure 24:
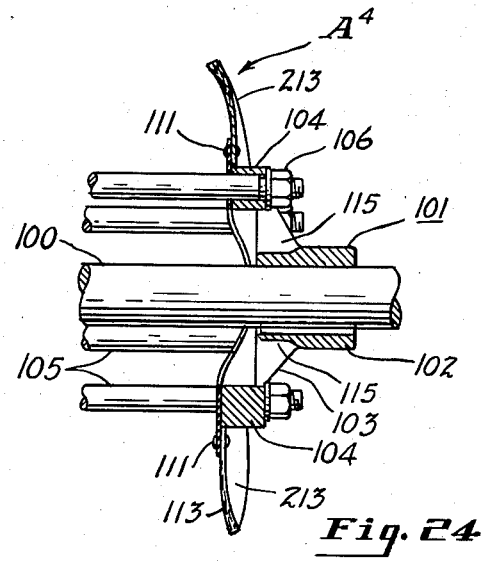
Figure 24 is a fragmentary vertical sectional view taken substantially on the line indicated at 24—24 in Fig. 23.

A series of sector-shaped metal sections 109 are provided, each having two circular holes of the same diameter as the rods 105, which are located so that four sections 109 may be mounted end-to-end to form a ring. Three packs of abrasive flaps or segments 110 are mounted on each section 109, said packs being connected to the metal sections by rivets 111. Each of these packs contains preferably about 5 to 15 segments held in aligned superposed relation with abrasive-coated faces 113 all extending in the same direction and non-abrasive faces 213 extending in the opposite direction. The sections 109 are in the form of flat sheets as indicated in Fig. 21 and are held in parallel regularly spaced relation in each of four rows by washers 112 which fit on the rods 105 and by the nuts 106 which clamp the sections together.

The axially inner surface of each portion 104 is sinuous so that all of the metal sections 109 in each row are inclined circumferentially the same amount relative to a plane perpendicular to the axis of the shaft 100 and the sections 109 in adjacent rows are inclined circumferentially the same amount, but in the opposite directions relative to said plane. It will be apparent that all of the flaps or segments 110 mounted on each section 109 are inclined circumferentially in the same direction as all of the other segments carried by that metal section with respect to said plane. The circumferential inclination is again at least about 5 degrees and preferably about 10 to 50 degrees measured between the corner points of each section 109 (which points are spaced apart 90 degrees). The circumferential inclination of the sheets 110 varies from zero at the end of a section 109 to a maximum at the center of that section.

As herein shown the segments 110 are curved so that they are inclined axially relative to a radial line perpendicular to the axis of the shaft 100, whereby the abrasive material at the work-engaging cylindrical surface of the wheel $A^4$ normally faces radially outwardly for engagement with the work. It will be noted from Fig. 22 that all of the abrasive-coated faces 113 of the segments of each section 109 face in the same axial direction and that all of the abrasive-coated faces 113 of the segments of the adjacent section 109 face axially in the opposite direction, whereby all of the abrasive-coated faces 113 of all of the segments 110 face in the same circumferential direction.

The locating surfaces of the hub members 104 and the sections 109 have the same sinusoidal shape around the circumference and may be so shaped that any radial plane containing the wheel axis intersects these surfaces along radial lines perpendicular to said axis. As a result each abrasive-coated sheet is held in cantilever fashion so that its radially inner portion has a radial cross section perpendicular to the wheel axis. During the polishing operation the centrifugal force straightens out the cross section of each segment so that any radial plane containing the wheel axis intersects a portion of a segment along a line perpendicular to the wheel axis.

It will be noted that four inlet openings 115 are provided in each hub member 101 between the portions 103 to provide passages for the admission of cooling air to the polishing wheel. The sections 109 are arranged so as to provide an annular air passage 116 extending the length of the wheel. The centrifugal force tends to draw the air radially outwardly so that the cool air flows between the washers 112 and between the adjacent metal sections 109 to the work-engaging surfaces of the wheel.

Figure 25:
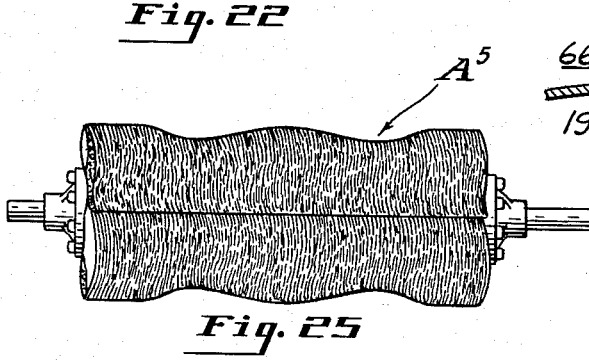
Figure 25 is a front elevational view on a reduced scale, showing how a polishing wheel constructed according to the present invention may be contoured for special applications.

The polishing wheels A to A⁴ are shown, for convenience as being externally cylindrical since this form would be used more than any other, but it will be apparent that the radial dimensions or radial positions of different segments may vary to obtain different surfaces of revolution at the periphery of the polishing wheel. Wheels of the desired cross section may, for example, be obtained by a truing operation employing a diamond or other suitable tool. Figure 25 shows a polishing wheel A⁵ constructed according to the present invention and having a special shape suitable for polishing a portion of an automobile bumper or some other curved metal object.

The specially shaped wheel will polish a similarly curved object more efficiently than a cylindrical wheel because it has less tendency to load and to become dull at the periphery of the segments, but a cylindrical wheel constructed according to the present invention polishes curved objects much more efficiently than those polishing wheels known prior to the present invention, particularly when spacers are employed between abrasive sheets as in Fig. 20a.

In each of the polishing wheels A to A⁴, abrasive-coated segments are provided which are inclined circumferentially in opposite directions. Figures 26 and 27 show a modified form of polishing wheel A⁶ in which all of the abrasive-coated segments are inclined circumferentially in the same direction around the circumference of the wheel.

This wheel is made up of a series of sheet metal hub members 120 which could be riveted to packs of abrasive-coated segmental sheets and mounted on the shaft 63 generally like the hub members 66. Each hub member 120 is formed from the same type of metal blank as the hub members 66 described above, but the metal of the blank is drawn so that the marginal portion of the hub member 120 has a different shape as indicated in Fig. 28. Each hub member 120 has a flat circular hub portion 121 with a key slot 163 so that it will fit on the shaft 63 if the optional key 263 is employed. The hub member has a series of radial portions 122 which connect the hub portion 121 to a continuous marginal portion 123. As herein shown the metal of the portion 123 is drawn so that any radial plane containing the axis of rotation of the wheel A⁶ will intersect said marginal portion along a line which is perpendicular to said axis, but it may be drawn so that said last-named line is inclined a small amount in a direction to cause more of the abrasive to contact the wheel (for example as in the wheel A⁷).

A series of openings 124 are provided between the portions 122 of the spider 120 so as to define passages extending the full length of the polishing wheel for conducting cooling air. The marginal portion 123 is drilled to provide a series of circular holes 125 of a size to receive the rods 126. The holes 125 correspond to the holes 81 of the hub members 66, it being understood that said holes 81 may be of the same size as the holes 125 to permit mounting of the hub members 66 on the rods 126 generally in the manner indicated in Fig. 26. In other words, the mounting of the sheet metal hub members on axially extending rods does not require a hub member having a circumferential configuration of the type shown in Figs. 28 and 30.

As shown in Figs. 26 and 27 the rods 126 locate four packs of abrasive-coated flaps or segments 127 on the marginal portion 123 of said hub member 120 with the radial side edges of the segments substantially in engagement as indicated in Fig. 27 so as to define a cylindrical work-engaging surface 131 when the wheel is rotated. Each segment 127 is in the form of a flexible non-metallic sheet of cloth or paper having a uniform layer of abrasive partices bonded to and completely covering one face 128 and having its opposite face free of an abrasive material. All of the segments 127 of the wheel A⁶ have their abrasive-coated surfaces 128 facing the same end of the wheel as indicated in Fig. 27.

The polishing wheel A⁶ is constructed so that the hub members 120 hold the segments 127 with all of their abrasive-coated faces facing in the same circumferential direction. This is accomplished by drawing the metal of the marginal portion 123 and forming the same to provide a series of circumferentially inclined sections 133 and a series of axially drawn sections 134 as best shown in Fig. 28. It will be noted that a straight line that is perpendicular to a radial line through the axis of the wheel and that extends in the general circumferential direction of any section 133 is inclined at least about 5 degrees and preferably about 10 to 50 degrees relative to a plane perpendicular to said axis.

The sections 133 provide means for holding the packs of segments 127 at an inclination relative to a plane perpendicular to the wheel axis and for holding the segments with all of the abrasive material facing the same circumferential direction. Each section 133 may be circumferentially curved between the adjacent sections 134 just like the section of the marginal portion 74 of the hub member 66 between the points 76 and 77 or the corresponding section of the marginal portion 74a; but, as shown herein, each section 133 has a peripheral outer edge which is located substantially in a plane (that is inclined relative to the wheel axis) as will be apparent from Fig. 28.

The abrasive-coated segments 127 of the wheel A⁶ may be the same size as the segments 82 of the wheel A³ and may have the same shape so that its cutting action is also the same. Every radial section of the portions 133 may be perpendicular to the wheel axis so that the segmental sheets 127 are presented to the work like the sheets 82.

The mounting of the abrasive-coated segments on rods as illustrated in Figs. 26 and 27 is very practical since it permits replacement of the segments after they are worn out without the necessity for riveting which is expensive and which requires special tools. The rods also transmit the forces to the sheet metal hub members from the work with a minimum strain on the hub members so that a high torque can be accommodated without bending the hub members out of shape even when the key 263 is omitted. The above advantages are obtained whether using the hub members 66 or the hub members 120, but the interfitting sections 134 of the members 120 have an additional advantage in that they reinforce the rods and assist in resisting the torque forces. The sections 134 may also be designed for an odd number of rows of abrasive segment since all the segments are inclined circumferentially in the same direction. A three-row wheel is therefore possible.

The clamping of the segmental sheets together by the rods 126 does not interfere substantially with the cooling of the wheel since the air can flow radially outwardly between the adjacent sheets even when they are clamped together. The centrifugal force ensures a flow of cooling air sufficient to provide adequate cooling.

In each of the polishing wheels $A^2$ to $A^6$ shown herein the outer marginal portions of the hub members provide rigid supports for the abrasive sheets which position the radially inner portion of each sheet so that any plane through that portion and containing the axis of rotation of the polishing wheel intersects that portion along a line perpendicular to said axis. Such a construction minimizes the area of contact between the abrasive material on each abrasive sheet and the work when the rotating polishing wheel engages the work and minimizes glazing caused by filling or loading of the spaces between adjacent particles of abrasive material.

Having the radial or axial cross section of each abrasive sheet substantially perpendicular to the work during polishing tends to minimize glazing as indicated above but is not always preferred especially during the last stages of polishing when the pressure between the wheel and the work should be reduced to give a very fine finish. The finest finishes can be obtained when the abrasive faces of the segmental sheets are inclined radially so that they face radially outwardly during polishing, whereby a substantial amount of abrasive on each sheet contacts the work without applying a high pressure against the work. Figures 31 to 35 illustrate one form of polishing wheel according to the present invention wherein the radially inner portion of each abrasive sheet is rigidly held in cantilever fashion so that its axial cross section is inclined (for example 70° to 85°) relative to the axis of rotation in a direction to expose more abrasive material at the periphery of the wheel.

Like the polishing wheels $A^2$ to $A^6$, the polishing wheel $A^7$ positions its abrasive sheets during rotation so that the angle between the axis of rotation and the axial cross section of each abrasive sheet is uniform throughout the length of each sheet and is the same for all sheets. In the wheel $A^7$, however, the circumferentially adjacent abrasive sheets are inclined radially in opposite directions so that all the abrasive faces face radially outwardly during rotation of the wheel at normal polishing speeds.

Except for the radial inclination of the abrasive sheets and the change in the shape of the marginal portion of each hub member, the polishing wheel $A^7$ may be constructed the same as the polishing wheel $A^3$ described above. As herein shown the hub members 66a of the wheel $A^7$ are not keyed to the shaft 63a like the hub members 66 since it is easier to assemble the wheel with the key omitted. It will be apparent, however, that a key may be included in a wheel similar to the wheel $A^7$ and that the wheel $A^3$ will function satisfactorily without being keyed to the shaft 63.

The wheel $A^7$ has a series of sheet metal hub members 66a mounted on a shaft 63a having the same diameter as the shaft 63 and spaced apart by annular spacing members 67. The hub members are rigidly held on the shaft by the nuts 65 which are screwed on the threaded portions 64 of the shaft. Each hub member 66a has a flat circuit hub portion 72a, a series of radially extending portions 73a, and an undulating marginal portion 74a. The hub member 66a is formed like the member 66 by bending and drawing a flat circular sheet metal blank but the marginal portion of the blank is drawn axially in opposite directions while being formed to a generally sinuous shape so that circumferentially adjacent marginal portions are inclined radially in opposite directions as is apparent from Figs. 32 and 33 and so that the wavy marginal edge 136 of each hub member 66a has axially offset portions 137 to 140. The drawing of the metal produces four triangular portions 141 which extend axially to join said offset portions.

The amount of drawing of the metal is proportional to its distance from the apex of each triangular portion 141. Location of the apex of each portion 141 adjacent the inner edge of the marginal portion 74a rather than midway between the inner and outer edges of said marginal portion produces only one triangle instead of two but has the disadvantage that it requires twice as much drawing of the metal near the outer edge of the marginal portion.

A series of circular holes 81a are provided in each marginal portion 74a to permit the mounting of a series of segments 82a in packs or sections on each hub member. Each segment 82a may be an abrasive-coated sheet identical to the segment 82 described above having three rivet holes 83a which may be aligned with three of the holes 81a to receive the rivets 80a. The rivets preferably have flat heads so that tightening of the nuts 65 does not tend to move the hub members 66a out of axial alignment. Similar rivets may be employed on the hub members 66. Three of the rivets 80a are sufficient to hold a pack, containing, for example, 5 to 15 segments 82a, securely in position without the aid of an additional circumferential strip similar to the ring 156. All of the abrasive-coated faces 84a of the segments in each pack face in the same axial direction and all the uncoated faces 85a of that pack face in the opposite direction. As in the wheel $A^3$ the packs are arranged in four rows with the packs of adjacent rows inclined circumferentially in opposite directions (as will be apparent from the diagrammatic showing of the hub in Fig. 34) and with the abrasive faces of adjacent rows facing opposite axial directions so that all of the abrasive faces face in the same circumferential direction. The packs are arranged end-to-end as indicated in Fig. 31 to form a cylindrical outer work-engaging surface 88a. The radially outer portion of the wheel is efficiently cooled by the air entering through the air passages 93a and passing between adjacent abrasive sheets 82a under the influence of centrifugal force.

The inner edges 142 of the marginal portion 74a of each hub member 66a are substantially the same as the inner edges of each marginal portion 74 described above and follow a sinusoidal-like line extending around the periphery of the hub member, all points of which line are located in a circular cylinder coaxial with the hub member. The outer edge of the marginal portion 74 of each hub member 66 (Figs. 17 and 18) follows a similar sinusoidal-like line which, if developed in a plane, would be a sine curve corresponding to the wavy line W shown in dot-dash lines in Fig. 34. As shown in Fig. 34 each of the developed edge portions 137 to 140, inclusive, is parallel to and conforms to the shape of the sinusoidal line W, indicating that any line of intersection of a plane containing the axis of rotation of the polishing wheel $A^7$ with the marginal portion 74a of a hub member would have the same radial inclination relative to said axis between the points x and z of each edge portion 137 to 140. In other words the radial inclination of the marginal portion 74a along each edge portion is preferably substantially uniform between the points x and z. As shown herein, the segments 82a are, therefore, supported during rotation of the wheel so that they have uniform radial inclination throughout their length. In a wheel constructed according to the present invention the abrasive flaps or segments are preferably supported so that the radial inclinations of their radially inner portions do not vary more than 10 degrees throughout the circumference of the polishing wheel.

The circumferential inclination of the marginal portion 74a, like that of the marginal portion 74, continually varies from zero to a maximum and back to zero. The circumferential inclination at point x of each edge portion 137 to 140 is zero and gradually increases to a maximum at point y of that edge portion. The circumferential inclination then decreases gradually from point y to point z and is again zero at point z. It will be noted that the radial inclination of the marginal portion 74a preferably remains substantially the same anywhere between points x and z. Such radial inclination preferably has the same magnitude for each of the segments 82a during the rotation of the wheel. In the wheel A³ the radial inclination is zero and is uniform throughout the periphery of each hub member 66.

It will be noted that a uniform radial inclination for the segments 82a cannot be obtained if the marginal portion 74a is bent to lie in a surface generated by a moving line having a fixed vertex and that a jog at 141 is necessary between adjacent rows of segments 82a to provide a reversal in radial inclination. The radial inclination for the marginal portion 74a is preferably no more than about forty degrees, which means that any radial plane containing the axis of rotation of the wheel and crossing one of the edge portions 137 to 140 will intersect the marginal portion 74a along a line which is inclined around 50 to 90 degrees relative to said axis of rotation.

A radial inclination greater than 40 degrees may be employed if the abrasive sheets or segments extend less than 90 degrees around the periphery of the wheel since centrifugal force will have more effect on the sheets as their length along the circumference is reduced. Radial inclination will, however, always tend to reduce the stiffness of the wheel. It is preferable to employ at least three and usually four, six or eight rows of abrasive sheets on a wheel of the general type shown in Figs. 31 to 35 so that each sheet extends circumferentially from 45 to 120 degrees. Where four rows of abrasive sheets are employed, a radial inclination of 20 to 30 degrees is usually employed.

A polishing wheel having only three rows of abrasive sheets would preferably resemble the wheel of Figs. 26 to 30. A radial inclination of only 15 or 20 degrees would be satisfactory for the hub member of such a three-row polishing wheel.

The packs of segments 82a are mounted on the marginal portion 74a of each hub member with the abrasive faces 84a facing radially outwardly as indicated so that the radial inclination of the marginal portion exposes more of the abrasive material for engagement with the work. The centrifugal force produced at normal polishing speeds tends to reduce this radial inclination near the periphery of the wheel but is insufficient to remove all of the inclination probably due to the inability of the inextensible sheets 82a to assume a shape which eliminates such inclination while conforming to the shape of the marginal portion 74a. The radial inclination makes it easier for the abrasive sheets to bend so as to reduce the stiffness of the wheel.

The operation of a wavy polishing wheel constructed according to the present invention can be better understood after a careful examination of Fig. 34, which is drawn substantially to scale. The sine curve W which represents a development of the sinuous peripheral edge of the hub member 66, intersects a straight line S at regularly spaced points I which are aligned with the points y of the edge portions 137 to 140. The high points of the curve W which are substantially aligned with the points x and z of each edge portion, indicate the axially innermost and axially outermost reversal points of the sinusoidal-like peripheral edge of the hub member 66. The circumferential inclination of the latter edge is reversed at said reversal points. Since the ends of each abrasive sheet 82a are located substantially at points x and z where the circumferential inclination is negligible, each sheet has maximum resistance to bending by axial forces when contacting the work near its ends. Since the circumferential inclination is at a maximum at point y, the resistance of each sheet 82a to bending by axial forces is at a minimum near the center of the sheet.

The pressure of the successive abrasive grains of one sheet 82a on the work in a circumferential direction, therefore, gradually decreases as the point of contact moves from the end toward the center of the peripheral edge of each sheet. The decrease in pressure in a circumferential direction results from the increased bending of the sheet which, bending, is followed by an axial movement of the point of contact of that sheet with the work and a change in direction of pressure. Such axial movement, together with the change in the direction of pressure, enables successive abrasive grains to break off each chip before it becomes large and prevents formation of unwanted grooves. The increase and decrease in pressure of the successive abrasive grains of each sheet on the work also facilitates breaking of the chips and tends to reduce the depth of the scratches formed on the surface of the work. Since the chips formed are relatively small they do not fill up the spaces between adjacent abrasive particles and do not build up around and over the abrasive particles to cause scratches or excessive frictional heat. The wheel is therefore, able to operate at extremely high speeds without overheating and operates efficiently until the abrasive sheets are worn out.

As indicated in Figs. 31, 32 and 35, the uncoated face 85a of an abrasive sheet 82a is held in engagement with the marginal portion 142 along each of the edge portions 137 to 140. The sheets 82a in adjacent rows are, therefore, located on opposite sides of the hub members as is apparent from Figs. 31 and 32. This arrangement is not essential, but is preferred when the hub members 66a are employed. It will be noted that a similar arrangement is shown in Figs. 14 to 20 and that an opposite arrangement is shown in Figs. 26 to 30.

Figures 36 and 37 show a modified form of polishing wheel A⁸ which is constructed the same as the polishing wheel A³ except that the abrasive sheets are mounted on the hub member in a different manner. The wheel A⁸ is made of a series of sheet metal hub members 66b, each having a flat circular hub portion 151, radial portions 152, and a wavy marginal portion 153 having the same shape as the marginal portion 74 of the hub member 66 described above. The marginal portion 153 has eight regularly circumferentially spaced elliptical openings 154 which are elongated in a circumferential direction. These openings are employed to attach four packs of abrasive-coated segments 82b to the hub member 66b.

Each abrasive sheet 82b is the same size and shape as the sheet 82 described above and is made of the same material; but, instead of being provided with rivet holes, the sheet 82b is provided with openings and notches which register with the opening 154. Each abrasive sheet 82b has an elliptical opening 155 aligned with an opening 154 and has two semi-elliptical notches, which align with the adjacent openings 154 as is apparent in Fig. 36. A wavy sheet metal ring 156 is provided, having a generally sinusoidal shape which conforms to the shape of the marginal portion 153, so that the packs of segments 82b may be clamped tightly in cantilever fashion between the parallel surfaces of the marginal portion 153 and the ring 156 as indicated in Fig. 37. The metal of the wavy ring 156 is drawn during forming of the ring to form axially extending portions 157 each having an elliptical cross-section and being located to fit within one of the openings 154. Mounting of the packs of segments 82b on the hub member 66b is effected by clamping the packs of segments between the marginal portion 153 and the ring 156 while allowing the portions 157 to extend through the openings 154 and bending or peening the ends of the portions 157 to form flanges 158. The flanges 158 rigidly hold the parts in position as indicated in Fig. 37.

In the polishing wheels A, A³, A⁴, A⁵, A⁶, A⁷, and A⁸ there is a maximum difference in the stiffness of the polishing wheel between the center and the radial edge of each abrasive sheet. This difference in stiffness may be reduced by cutting a radial slit in each abrasive sheet near the center thereof or at the point where the curvature of the sheet reverses so that the polishing wheel produces a more uniform finish. Such radial slits may be advantageous when the polishing wheel is employed at the end of the polishing operations on a given article to produce a very fine finish.

Each of the sector-shaped abrasive segments 82 of

Fig. 19, for example could be provided with a radial slit 187 through its center to form a segment 82c as shown in Fig. 38. The slits of all the segments 82c of each pack mounted on the hub member 66 would then be axially aligned, but such alignment is not essential. Each of said slits may extend radially from the outer edge of the segment more than half the radial width of the segment.

It will be understood that each of the polishing wheels disclosed herein may be provided with sufficient air passages to obtain the needed cooling during the polishing operations. Centrifugal force may be utilized to obtain the needed movement of cooling air.

In each of the polishing wheels A to $A^8$ described herein, the hub member, or supporting member which holds the segments has an external diameter which is preferably not substantially less than two-thirds the maximum diameter of the polishing wheel, and each abrasive-coated segmental sheet is supported in cantilever fashion so that at least ½ inch of the segment at the radially inner portion thereof is rigidly held against bending movement. The radial dimension of each segmental sheets is usually 2 to 5 inches and is preferably about 3 to 4 inches and no more than one third the diameter of the wheel. This construction insures that the segmental sheets have little tendency to bend so that the polishing wheel is aggressive and capable of high accuracy work. The external diameter of each of the polishing wheels disclosed herein is preferably 10 to 25 inches, where the surface speeds employed for polishing are between 3500 and 12,000 feet per minute, but it will be apparent that advantages of the invention can be obtained with polishing wheels of smaller or larger diameter (i.e., 6-inch or 30-inch wheels).

In each of the polishing wheels A to $A^8$ the circumferential inclination of the segmental sheets is preferably relatively small (at least 5° and preferably 10° to 50°) so that the wheel is stiff when it contacts the work during the polishing operation. In other words, each segmental sheet (except in wheel $A^4$) is supported so that the major portion thereof at its periphery intersects a cylinder coaxial with the polishing wheel along a line which is generally inclined at least 5° and preferably about 10° to 50° relative to a plane perpendicular to the axis of said wheel. A line joining the peripheral corner points of any of the sector-shaped abrasive sheets disclosed herein (except sheets 110) would also be inclined at least 5 and preferably 10 to 50 degrees relative to a plane perpendicular to the axis of rotation when the wheel was operating at polishing speed.

It will be noted that the peripheral corner points of the sector-shaped abrasive sheets 82a are located at the work-engaging surface 88a in radial alignment with the points x and z shown in Fig. 34. A line joining the peripheral corner points of each sheet 82a would be parallel to a line joining the points x and z and would be inclined relative to a plane perpendicular to the axis of rotation of the polishing wheel $A^7$ at least about 5 degrees and preferably about 10 to 50 degrees. A line joining the peripheral corner points of each sheet 82 of the wheel $A^3$ is preferably inclined the same amount. A similar circumferential inclination is preferably provided for the abrasive sheets of the wheels A, A', $A^2$ and $A^6$.

It will be noted that a circular cylinder coaxial with the polishing wheel will intersect the face of each abrasive flap or sheet of any of the polishing wheels described herein along a line of intersection which is inclined relative to a first plane perpendicular to the axis of rotation of said wheel. The "circumferential inclination" of the flaps at any point on said line of intersection, as the quoted term is used in this application, is the inclination of said line of intersection relative to said first plane at said point at any instant during rotation of the polishing wheel. The term "circumferential inclination" has this meaning wherever employed in this application.

It will also be noted that a second plane containing the axis of rotation of any of the polishing wheels disclosed herein will intersect the non-abrasive face of each abrasive flap or sheet of that wheel along a second line which is preferably disposed relative to said first plane (perpendicular to the axis of rotation) at an angle up to about 40 degrees measured in a direction away from the abrasive face of that flap. The "radial inclination" of the flap at any point on said second line is the inclination of said second line relative to said first plane at that point. The term "radial inclination" has this meaning whenever used in the present application.

It will be noted that, in each of the polishing wheels disclosed herein, said second line is preferably disposed relative to the axis of rotation of the polishing wheels at an angle of about 50 to 90 degrees anywhere in the neighborhood of the radially inner edge of the abrasive flap whereby the radial cross section of the flap is either perpendicular to the axis of rotation or is inclined radially in a direction to exposed more of the abrasive grains.

It is indicated in this specification that the abrasive grains of each abrasive flap should face radially outwardly when they engage the work. This means that the radially outer portion of each abrasive flap engaging the work should be bent so that it is radially inclined in a direction to place the abrasive grains between the work and the cloth backing whereby the abrasive face of the flap and the cutting edges of the abrasive grains face radially outwardly and the non-abrasive faces of the flap face radially inwardly. It can be said that the abrasive surfaces face radially outwardly even when the radial inclination is only ten degrees (when the radial cross section of the flap is inclined only 80 degrees relative to the axis of rotation), since portions of the abrasive faces become visible in a radial direction when such faces are inclined radially even a small amount. Likewise the abrasive surfaces face in circumferential direction even where the circumferential inclination is only 5 degrees or so.

It will be understood that any of the abrasive-coated sector-shaped flaps disclosed herein may be cut from the same sheets which are used to form the segments a and a'. Such sheets may, for example, be of the various types disclosed in U.S. Patent No. 2,704,916. The entire abrasive face of each flap is preferably covered with abrasive material. The abrasive material may be in various forms but is preferably in the form of abrasive grains bonded to a relatively non-abrasive flexible backing. The backing is preferably a cloth (for example of the type used in conventional emery cloth). Cloth backings are preferred for polishing steel, but many of the advantages of the invention may also be obtained using paper backings or other backings. Such backings are considered to be "non-abrasive" wherever the term is used in the specification and claims since the material thereof does not have substantial cutting action on metal. Crosswoven cloth is usually employed as the backing and is bonded to the abrasive grains.

Each of the polishing wheels A to $A^8$ positions the abrasive-coated flaps or segments at an inclination relative to the axis of rotation so that the point of contact of each flap moves, relative to the article being polished, in the axial direction in which the abrasive-coated side face of said flap faces, whereby the abrasive grains on the flap precede the backing into the work. Such relative axial movement also tends to bend the radially outer portion of the flaps, at the point of contact, so that the cutting edges of the abrasive grains at the point of contact face radially outwardly for engagement with the work. The total amount of axial movement of the point of contact per revolution of the polishing wheel is preferably less than half the circumference of the wheel and is usually 1% to 20% of said circumference.

Each of the polishing wheels A to $A^6$ may be constructed so that it is very stiff when operated at polishing speeds so that a very high force is required to bend the flaps substantially. An excellent method of polishing is to cause each flap of the polishing wheel to contact the work during at least 90% of the polishing operation only within one millimeter (.04 inch) of its peripheral edge and preferably only within .02 inch of said edge while applying a force against the work of 50 to 1000 pounds per square inch by positioning the flap with its radial cross section perpendicular to the axis of rotation and maintaining a surface speed (i.e., 3500 to 15,000 feet per minute) sufficient to produce the centrifugal force needed to overcome said first-named force and to prevent more than the above-mentioned amount of contact. When performing this method the polishing wheels of the present invention cause substantial axial movement of the point of contact of each flap with the work as mentioned previously.

The method may be performed with wheels having a diameter less than 5 inches or greater than 30 inches, but it is more common to employ diameters within these extremes. Polishing wheels of the type shown herein having contacting superposed abrasive flaps mounted on closely spaced hub members (i.e., 15 to 40 flaps per inch of axial width) and having a diameter of 12 to 20 inches can perform this method while polishing at surface speeds of 3500 to 15,000 feet per minute when the pressure between the work and the wheel is 15 to 200 pounds per inch of axial width so that each flap contacts the work only within one millimeter of its peripheral edge. This method is optional and is best employed with cylindrical wheels when polishing cylindrical articles (that are rotated during polishing) or flat articles. With this method there is no substantial build-up of foreign material and no substantial dulling of the abrasive grains before the grains are worn from the wheel so it is feasible to polish many different types of materials. The polishing wheels of the present invention when provided with the proper abrasive may be used to polish glass, wood, aluminum, copper, lead, plastic, etc. in addition to iron or steel.

In each of the polishing wheels A, A', A$^2$, A$^3$, A$^4$, A$^7$, and A$^8$ described above a multiplicity of abrasive-coated flexible flaps or segments are arranged in laminated sections or packs on a series of hub members with the sections arranged in axially extending rows in end-to-end relation to form a work-engaging surface of revolution. A cylindrical surface of revolution coaxial with any of these polishing wheels and concentric to said work-engaging surface would intersect the laminated sections and the flaps thereof, during rotation of the polishing wheel at polishing speed, along curved lines which are parallel to a wavy line contained in said cylindrical surface. Said wavy line changes its direction of circumferential inclination at an even number of reversal points or reversal zones which are preferably evenly spaced as in the wavy line represented by the developed line W of Fig. 34. A line joining successive reversal points of such wavy line is circumferentially inclined at least 5 and preferably 10 to 50 degrees relative to a plane perpendicular to the axis of rotation of the polishing wheel.

The circumferential inclination at any point on said wavy line preferably increases gradually in a direction away from each of the nearest reversal points and is at a maximum midway between said reversal points. In such case the circumferential inclination adjacent the reversal points may be substantially less than 5 degrees, but a major portion of the wavy line would be circumferentially inclined more than 5 and preferably 10 to 50 degrees. The change in circumferential inclination of the abrasive-coated flaps along the circumference of the polishing wheel causes changes in the rate of relative axial movement between the work and the point of contact of each flap with the work which tend to break off the chips as they are formed and to prevent successive abrasive grains from cutting an unwanted groove.

As shown herein, the abrasive flaps of all the polishing wheels are axially aligned in separate rows but it will be apparent that the flaps and the various laminated sections need not be axially aligned but may be arranged in many other ways to provide the desired circumferential inclination for the flaps. At least 90 percent and preferably all of the abrasive-covered surfaces of the flaps face circumferentially in one direction, and at least 85 percent and preferably all of the surfaces of the flaps facing in the opposite circumferential direction are free of abrasive material in each of the polishing wheels shown and described herein. At least 85 percent of the surface of each flap of the polishing wheel facing in one circumferential direction is preferably covered with abrasive material and at least 85 percent of the surface of that flap facing in the opposite circumferential direction is preferably free of abrasive material.

Each flap of each of the herein described wheels is preferably free of sharp bends, corrugations, wrinkles, kinks or other contortions during rotation of the polishing wheel. Curling of the radial cross section of the flap as indicated, for example, in Figs. 13, 20 and 37 is desirable however. Each flap should have less than three reversals of curvature and less than three (preferably no more than one) reversals of circumferential inclination. The major portion of each flap and also a line through the peripheral corner points of each flap are circumferentially inclined at least 5 and preferably 10 to 50 degrees. All of the abrasive flaps are preferably constructed and supported so that all of the marginal portions of their abrasive-coated faces normally face radially outwardly and so that they face radially outwardly when they engage the work. When the polishing wheel is rotated in the proper direction so that the pressure of the work on each flap bends the flap in a direction to expose more abrasive material, an increased radial pressure between the work and the wheel offsets the marginal edges of adjacent flaps and exposes more abrasive material.

The radial pressure may be reduced to permit a finer finish while still obtaining sufficient exposure of abrasive if the marginal edges of adjacent flaps are normally out of axial alignment and are regularly spaced to provide a stepped arrangement, but such initial arrangement cannot be maintained throughout the life of the abrasive flaps due to the fact that the radially projecting edges of the flaps will wear faster than the other edges until all the edges are axially aligned. It is for this reason that accurate positioning of the peripheral edges of the flaps is not necessary. The polishing wheel may easily be trued to make up for any initial inaccuracy.

If it is desired to provide a wheel for producing an extremely fine finish which does not require high radial pressure against the work and which is not as aggressive as the wheels A to A$^6$ disclosed herein, the flaps may be provided with radial inclination during rotation of the wheel, for example as in the polishing wheel A$^7$. In such a case each flap extends about 60 to 120 degrees around the periphery and a plane containing the axis of rotation of the wheel intersects the rigidly supported radially inner portion of that flap along a line that is preferably disposed at an angle of about 50 to 70 degrees relative to the axis. In a wheel similar to the wheel A$^7$ at least 90 percent and preferably all of the circumferential length of the supported radially inner portion of each flap is angularly disposed relative to the axis of rotation so that the radial inclination at any point is at least 20 and not in excess of 40 degrees in a direction to expose of the abrasive material at the periphery of the wheel. Such radial inclination is preferably provided throughout at least 90 percent of the periphery of the polishing wheel.

If it is desired to provide a more aggressive wheel, the radial inclination of the abrasive flaps may be reduced; but, where the flaps each extend circumferentially about 60 to 120 degrees, at least 90 percent and preferably all of the circumferential length of the radially inner portion of each flap has a radial inclination at any point not in excess of 5 degrees in a direction tending to cause the non-abrasive face of the flap to face radially outwardly. A radial inclination of less than 5 degrees in that direction is preferably provided throughout at least 90 percent of the periphery of any of the polishing wheels described herein.

Where the flaps are inclined radially in the same direction or in opposite direction, the radial inclination of the rigidly supported radially inner portions of the flaps should vary in magnitude no more than 10 degrees throughout at least 90 percent and preferably all of the circumference of the polishing wheel. The direction of radial inclination will, of course, be reversed if the direction of circumferential inclination is reversed. Such radial inclination should vary less than 10 degrees throughout at least 90 percent of the length and preferably throughout the entire length of each abrasive flap. The variation of less than 10 degrees in radial inclination described in this paragraph applies to all of the polishing wheels disclosed herein even where the radial cross section of each flap is perpendicular to the axis of rotation.

It will be understood that the radial inclination mentioned above refers to the permanent inclination which is not affected by centrifugal force and not to the shape of the flaps radially outwardly of the hub members. Where the radially inner portion of a flap is radially inclined 25 or 30 degrees, the free radially outer portion of the flap may be radially inclined 50 or 60 degrees when the polishing wheel is not rotating due to the curved radial cross section of the flap. Centrifugal force will, of course, reduce the latter radial inclination during the polishing operation.

The radial inclination of the flap at the periphery during rotation of the wheel will depend somewhat on the stiffness of the flap, the radial and circumferential dimensions of the flap and the type of connection between the flap and the hub member. Auxiliary rings similar to the rings 156 tend to stiffen the flaps more than rivets without such rings as in Figs. 14 to 20 and Figs. 31 to 35, for example, but the rivets alone are usually sufficient to provide a rigid cantilever support for the radially inner portions of the flaps. The radially inclined flaps in a polishing wheel of the general type shown in Figs. 31 to 35 preferably have a length of about one-sixth to one-third the circumference of the wheel and preferably have a radial width not in excess of one-third the diameter of the wheel.

The abrasive flaps or segments employed in the polishing wheels of the present invention preferably have arcuate peripheral edges and straight radial side edges, for example, as indicated in Fig. 12 or Fig. 19, but the shape may vary somewhat. The radial side edges, for example, need not be straight and need not be perpendicular to the axis of rotation. The term "radial" is used herein in its broadest sense.

The shape and construction of the flap-supporting hub means may also vary considerably. Each hub member may be made of wood, plastic or other rigid material instead of metal or sheet steel. The parts of the marginal portion of the hub member that are inclined circumferentially in opposite directions may, for example, be made of separate parts like the hub members of Figs. 21 to 23. As herein shown, the parts of the marginal portions of the hub members which are inclined in the same direction are axially aligned and parallel but it will be apparent that the wheel can function even where these parts are circumferentially offset so as to be out of axial alignment.

The term "parallel" wherever used in the specification or claims is used in its broadest sense so as to cover not only parallel straight lines or planes but also curved lines or surfaces which have the same shape and are arranged so that corresponding points are spaced the same distance apart. The marginal portions of the hub members and the flaps in each row may, therefore, be considered parallel even though they are curved circumferentially. The sinusoidal-like surfaces of the hub members likewise may be considered parallel in the polishing wheels $A^3$, $A^4$, and $A^7$, for example.

The term "hub" wherever used in the specification or claims is used in its broad sense to cover means mounted concentric to the shaft for supporting the abrasive sheets. The term covers not only the sheet metal spiders 32, 66, 66a, 66b, and 120 but also a sinuous ring similar to the marginal portions of said spiders (i.e., the marginal portions 74, 74a and 123) or similar to the ring 156. A series of such rings held concentric to the shaft 100 by engagement of their radially inner edges with the outermost portions of the rods 105 and held against rotation solely by axial projections (such as those at 104) pressing against the ring at the end of the wheel would be considered "hub members" even though they were spaced radially from the shaft.

Figures 7 to 37 are drawn substantially to scale to illustrate the exact shape the polishing wheels may have, but it will be apparent that the shape and type of wheel may vary substantially without losing all of the advantages of the present invention.

This application is a continuation-in-part of my co-pending application Serial No. 667,088, filed June 21, 1957, and now abandoned.

It is to be understood that the above description is by way of example rather than limitation and that, in accordance with the provisions of the patent statutes, variations and modifications of the specific devices herein shown and described may be made without departing from the spirit of the invention.

Having described my invention, I claim:

1. In a polishing wheel, a hub having marginal portions, a multiplicity of wrinkle-free abrasive-coated flexible flaps arranged in axially superposed relation to form a series of arcuate laminated sections disposed end-to-end on said hub and having end edges and arcuate peripheral edges, each of said sections extending circumferentially about 60 to 120°, means carried by said marginal portions for holding the radially inner portions of the laminated sections so that the end edges of said sections are closely spaced and the peripheral edges of said sections extend circumferentially to define a circumferential work-engaging surface, said last-named means causing the major portion of each laminated section to have a circumferential inclination of about 5 to 50 degrees, the faces of the flaps facing in one circumferential direction being covered with abrasive material, the opposite faces of the flaps being substantially free of said abrasive material.

2. The combination defined in claim 1 wherein the circumferential inclination of the laminated sections is reversed at regularly spaced reversal points around the circumference of the hub, each of the laminated sections being arranged between successive reversal points, the circumferential inclination of each laminated section gradually increasing in a circumferential direction away from each adjacent reversal point and being greatest at a point substantially midway between successive reversal points.

3. In a laminated one-direction polishing wheel; a hub having a series of marginal portions; a multiplicity of abrasive-coated flexible flaps arranged in axially superposed relation to form a series of laminated sections having end edges and arcuate peripheral edges, each of said sections extending circumferentially about 60 to 120°, said flaps being substantially free of sharp bends, wrinkles and corrguations; means carried by said marginal portions for holding the laminated sections in an end-to-end arrangement with the peripheral edges of said sections extending circumferentially to define a circumferential work-engaging surface and for positioning the laminated sections so that they are inclined circumferentially in different directions, said means reversing the circumferential inclination of the flaps at reversal zones located adjacent the edges of said sections, the faces of the flaps facing in one circumferential direction being covered with abrasive material, the opposite faces of the flaps being substantially free of said abrasive material.

4. A polishing wheel comprising a series of segmental flexible flaps, each having abrasive material bonded to one side face only thereof and having a circumferentially extending work-engaging edge, each of said flaps extending circumferentially about 60 to 120°, hub means for holding the flaps in superposed relation in 3 to 6 axial rows around the circumference of the wheel so that the work-engaging edges of the sheets are located substantially in a surface of revolution when the wheel is rotated, said hub means being mounted for rotation about the axis of said surface of revolution and having means for holding the radially inner portion of each segment so that the major portion thereof is circumferentially inclined up to 50° relative to a plane perpendicular to said axis and intersects any radial plane containing said axis substantially along a line which is disposed relative to said axis at an angle of about 50 to 95 degrees, all of the flaps in each row being inclined in the same circumferential direction and having abrasive-coated faces facing axially toward one end of the wheel, the magnitude of the radial inclination of the radially inner portion of each segment varying less than about 10 degrees throughout the length of that segment.

5. A laminated one-direction polishing wheel comprising a hub, a multiplicity of flexible flaps mounted on said hub in axially superposed relation to form 3 to 6 circumferentially extending laminated sections arranged end-to-end around the circumference of the hub, each of said flaps extending circumferentially about 60 to 120°, and means carried by said hub for holding the radially inner portions of the flaps in position on the wheel during rotation thereof so that the flaps extend radially outwardly and for locating the end edges of each flap in axially offset positions so that each flap is inclined circumferentially, each flap comprising a backing sheet having abrasive grains bonded to and covering one face only of the sheet, the flaps in each section having their abrasive-covered faces facing axially in the same direction, each flap of the polishing wheel having its abrasive-coated face facing in the same circumferential direction so that the abrasive grains will precede the backing into the work.

6. In a laminated one-direction polishing wheel mounted for rotation about an axis, a multiplicity of flexible abrasive sheets mounted in axially superposed relation to form a series of circumferentially extending laminated sections arranged end-to-end around the circumference of the wheel, said sheets defining a work-engaging surface of revolution having a diameter at least about three times the radial width of said sheets, each of said sheets extending circumferentially about 60 to 120°, hub means having a marginal portion of generally circumferentially sinuous form for rigidly holding the radially inner portions of said abrasive sheets in cantilever fashion and for locating the end edges of each sheet in axially offset positions so that a line through the outer corners of any sheet is inclined generally in one circumferential direction not substantially less than 5 degrees and not substantially more than 50 degrees, said hub means holding the radially inner portion of each abrasive sheet so that planes containing said axis of rotation intersect the latter portion along radial lines which intersect said axis at an angle of about 50 to 95 degrees, the sheets of all sections which are inclined in one circumferential direction intersecting planes containing said axis along radial lines which intersect the axis at generally the same angle measured in one direction from said axis, the sheets of all sections which are inclined in the opposite circumferential direction intersecting planes containing said axis along radial lines which intersect the axis at generally the same angle measured in the opposite direction, the faces of said sheets facing in one circumferential direction being covered with abrasive material, the major portion of the opposite faces of said sheets being free of said abrasive material.

7. In a polishing wheel, a hub member having a circumferentially wavy marginal portion that conforms substantially to a wavy surface which intersects a cylinder coaxial with said hub member along a wavy circumferential line that reverses its circumferential inclination at an even number of circumferentially spaced reversal points around its periphery, the parts of said marginal portion between successive reversal points each being inclined circumferentially in one circumferential direction and in the opposite circumferential direction as the adjacent parts of said marginal portion, a multiplicity of flexible abrasive flaps mounted in cantilever fashion on said hub in axially superposed relation to form 3 to 6 arcuate laminated sections disposed end-to-end on said hub and having circumferentially closely spaced radial side edges and circumferentially extending peripheral edges defining a work-engaging surface of revolution extending around the hub member, each flap comprising a backing sheet having one face coated with abrasive material and its opposite face free of such material and having its radial end edges between successive reversal points so that the abrasive face is inclined circumferentially in the preferred direction of rotation of the hub member, said hub member having means on said marginal portion for holding the radially inner portions of the circumferentially extending flaps so that the abrasive faces of all of the flaps face in the same circumferential direction and are inclined radially up to 40 degrees in a direction to expose more of the abrasive material.

8. In a polishing wheel, a hub having a circumferentially wavy marginal portion that conforms substantially to a wavy surface which intersects a cylinder coaxial with said hub along a wavy circumferential line that reverses its circumferential inclination at an even number of circumferentially spaced reversal points around it periphery, the parts of said marginal portion between successive reversal points each being inclined circumferentially in one circumferential direction and in the opposite circumferential direction as the adjacent parts of said marginal portion, a multiplicity of flexible abrasive flaps mounted in cantilever fashion on said hub in axially superposed relation to form 3 to 8 laminated sections disposed end-to-end on said hub and having circumferentially closely spaced end edges and circumferentially extending peripheral edges defining a work-engaging surface of revolution extending around the hub, each flap comprising a backing sheet having one face coated with abrasive material and its opposite face free of such material and having its end edges between successive reversal points so that the abrasive face is inclined circumferentially in the preferred direction of rotation of the hub member, any line through the successive reversal points on said first-named wavy line being inclined circumferentially at least about 5 degrees relative to a plane perpendicular to the axis of rotation of said hub member.

9. The combination defined in claim 8 wherein a plurality of said laminated sections are arranged end-to-end between two successive reversal points with the abrasive faces of all of the flaps thereof inclined circumferentially in the same direction, the circumferential inclinations of each flap gradually increasing in a circumferential direction away from the reversal points.

10. A laminated one-direction polishing wheel comprising a multiplicity of sheets of substantially uniform thickness, each of said sheets comprising a flexible backing layer and a layer of abrasive particles bonded to said backing layer and substantially completely covering the same, each sheet being in the shape of a sector and being in contact with and in alignment with another sheet of the same size, said sheets being arranged in superposed contiguous relation to form a multiplicity of laminae, said laminae being mounted in 3 to 8 axial rows and having their peripheral edges arranged end to end to form a work-engaging surface, each of said laminae having radial end edges adjacent the radial end edges of the laminae in two adjacent rows, each lamina having a peripheral edge at said work-engaging surface arranged along a generally sinuous line, abrasive-coated areas on each side of each lamina being circumferentially spaced and in axial alignment with uncoated areas on the opposite side of that lamina, said areas being arranged so that all the abrasive-coated areas face in one circumferential direction and all the uncoated areas face in the opposite circumferential direction, and means for holding said sheets in position on said wheel and for clamping said laminae together.

11. A laminated one-direction polishing wheel comprising a hub having a circumferentially wavy marginal portion that conforms generally to a wavy surface which intersects a cylinder coaxial with said hub generally along a wavy circumferential line that reverses its circumferential inclination at an even number of circumferentially spaced reversal points around its periphery, the parts of said marginal portion between successive reversal points each being inclined circumferentially in one circumferential direction and in the opposite circumferential direction as the adjacent parts of said marginal portion, a multiplicity of circumferentially extending flexible abrasive flaps mounted in cantilever fashion on said hub and arranged end to end around the circumference of the wheel, each flap comprising a circumferentially elongated woven cloth backing sheet having abrasive grains bonded to and covering one face of said sheet and having its opposite face free of abrasive material, means on the marginal portion of said hub for holding the flaps on the hub so that their circumferential inclination gradually increases and decreases and the circumferential inclination of each flap reverses less than two times between the radial end edges of that flap, said last-named means holding the flaps in axially superposed relation in 3 to 8 arcuate laminated sections having circumferentially closely spaced radial side edges and circumferentially extending peripheral edges defining a work-engaging surface of revolution extending around the hub member, each flap having its radial end edges between successive reversal points and having its abrasive face inclined circumferentially in the preferred direction of rotation of the hub member.

12. A one-direction polishing wheel as defined in claim 11 wherein said hub and said last-named means hold the radially inner portions of the flaps so that all radial planes containing the axis of rotation of said hub intersect said radially inner portions along radial lines generally perpendicular to said axis and the radial inclinations of said radial lines vary less than 10 degrees substantially throughout the circumference of the hub.

13. In a laminated one-direction polishing wheel, in combination, a sheet metal spider having a continuous wavy marginal portion of sinusoidal-like shape, any radial plane containing the axis of rotation of said spider intersecting said marginal portion along a radial line substantially perpendicular to said axis, a multiplicity of circumferentially elongated abrasive-coated flexible flaps arranged in axially superposed relation to form 3 to 8 arcuate laminated sections disposed end to end around said hub and having end edges and arcuate peripheral edges, said flaps being substantially free of sharp bends, wrinkles and corrugations, means carried by said marginal portions of said spider for holding the laminated sections in an end to end arrangement with the peripheral edges of said sections extending circumferentially to define a circumferential work-engaging surface extending around the wheel, the faces of the flaps facing in one direction being covered with abrasive material, the opposite faces of the flaps being substantially free of said abrasive material.

14. A combination as defined in claim 7 wherein each of said laminated sections extends throughout about one-fourth the periphery of said hub member, four of said sections being arranged end to end to provide said work-engaging surface.

15. A laminated one-direction polishing wheel comprising a hub, a multiplicity of circumferentially extending flexible abrasive flaps mounted in cantilever fashion on said hub around the circumference of the wheel, each flap comprising a woven-cloth backing sheet extending circumferentially about 60 to 120 degrees having abrasive grains bonded to and covering one face of said sheet and having its opposite face free of said abrasive grains, means on said hub for holding the flaps in axially superposed relation so that their circumferential edges are sinuous and for locating the end edges of each flap in radial axially offset positions so that a line through the radially outer corners of each flap is inclined about 5 to 50 degrees, the circumferential inclination of each flap gradually increasing and decreasing and reversing only once between its radial end edges, said last-named means also holding the flaps so that the opposite end portion of each flap extends substantially in a circumferential direction and substantially all of the abrasive face of each flap faces the same circumferential direction as the abrasive faces of the other flaps.

16. A laminated one-direction polishing wheel comprising a hub, a multiplicity of circumferentially elongated flexible flaps mounted on said hub in axially superposed relation to form a series of circumferentially sinuous laminated sections arranged end to end around the circumference of the hub, means for holding the radially inner portions of the flaps so that any radial cross section thereof is substantially perpendicular to the axis of rotation and for locating the end edges of each flap in radial axially offset positions while reversing the circumferential inclination of each flap only once between the radial end edges thereof, each flap comprising a circumferentially elongated woven-fabric backing sheet having a covering layer of abrasive grains bonded only to one face of the sheet, the opposite face of the sheet bring free of abrasive grains, the flaps in each section having substantially all of the abrasive-coated faces facing in the same circumferential direction and in the same axial direction.

References Cited in the file of this patent
UNITED STATES PATENTS

| | | |
|---|---|---|
| 269,688 | Levett | Dec. 26, 1882 |
| 968,431 | Stevens | Aug. 23, 1910 |
| 1,377,598 | Paoli | May 10, 1921 |
| 1,753,201 | Edlich | Apr. 8, 1930 |
| 2,017,925 | Siefen | Oct. 22, 1935 |
| 2,104,925 | Goodman | Jan. 11, 1938 |
| 2,110,494 | Zimmerman | Mar. 8, 1938 |
| 2,168,871 | Hagne | Aug. 8, 1939 |
| 2,197,661 | Hargy | Apr. 16, 1940 |
| 2,462,741 | Hall | Feb. 22, 1949 |
| 2,479,941 | Kummer | Aug. 23, 1949 |
| 2,506,288 | Bahr | May 2, 1950 |
| 2,643,493 | Zimmerman | June 30, 1953 |
| 2,645,065 | Kietzmann | July 14, 1953 |
| 2,704,916 | Peterson | Mar. 29, 1955 |
| 2,755,608 | Peterson | July 24, 1956 |
| 2,767,524 | Schaffner | Oct. 23, 1956 |

UNITED STATES PATENT OFFICE
CERTIFICATION OF CORRECTION

Patent No. 2,964,887                            December 20, 1960

Gilbert H. Orozco

It is hereby certified that error appears in the above numbered patent requiring correction and that the said Letters Patent should read as corrected below.

Column 28, line 48, for "bring" read -- being --.

Signed and sealed this 9th day of May 1961.

(SEAL)
Attest:

ERNEST W. SWIDER                                    DAVID L. LADD
Attesting Officer                                       Commissioner of Patents